(12) United States Patent
Holtzman

(10) Patent No.: US 11,029,062 B2
(45) Date of Patent: Jun. 8, 2021

(54) GEOTHERMAL HEAT MINING SYSTEM

(71) Applicant: Strabo Engineering, LLC, New York, NY (US)

(72) Inventor: Benjamin Holtzman, New York, NY (US)

(73) Assignee: Strabo Engineering, LLC, New York, NY (US)

( * ) Notice: Subject to any disclaimer, the term of this patent is extended or adjusted under 35 U.S.C. 154(b) by 0 days.

(21) Appl. No.: 16/940,281

(22) Filed: Jul. 27, 2020

(65) Prior Publication Data

US 2021/0025623 A1    Jan. 28, 2021

Related U.S. Application Data

(60) Provisional application No. 62/878,578, filed on Jul. 25, 2019.

(51) Int. Cl.

| | | |
|---|---|---|
| *F24T 10/20* | (2018.01) | |
| *F24T 10/00* | (2018.01) | |
| *F24T 10/30* | (2018.01) | |
| *E21B 7/04* | (2006.01) | |
| *E21B 43/26* | (2006.01) | |
| *E21B 43/30* | (2006.01) | |

(52) U.S. Cl.
CPC ............. *F24T 10/20* (2018.05); *E21B 7/04* (2013.01); *E21B 43/26* (2013.01); *E21B 43/305* (2013.01); *F24T 10/00* (2018.05); *F24T 10/30* (2018.05); *F24T 2010/56* (2018.05)

(58) Field of Classification Search
CPC ........ F24T 10/30; F24T 10/13; Y02E 10/125; Y02E 10/10; F03J 3/08; F24J 3/085
See application file for complete search history.

(56) References Cited

U.S. PATENT DOCUMENTS

| | | |
|---|---|---|
| 3,424,254 A | 1/1969 | Huff |
| 4,094,356 A | 6/1978 | Ash et al. |

(Continued)

FOREIGN PATENT DOCUMENTS

| | | |
|---|---|---|
| CN | 106368608 | 2/2017 |
| CN | 110173246 | 8/2019 |

(Continued)

OTHER PUBLICATIONS

Modelling of Flow and heat transport in vertical loop ground heat exchangers (Year: 2014).*

(Continued)

*Primary Examiner* — Shafiq Mian
(74) *Attorney, Agent, or Firm* — Thorpe North & Western, LLP.

(57) ABSTRACT

A geothermal heat mining system can operate within a single primary borehole in a geothermal reservoir. A primary fluid loop can include a cold working fluid line leading into the primary borehole and a hot working fluid line coming out of the primary borehole. A secondary fluid loop can be located down the primary borehole, where the secondary fluid loop is in thermal contact with the geothermal reservoir. A downhole heat mining device can control a rate of heat transfer from the secondary fluid loop to the primary fluid loop by selectively controlling fluid flow through the primary fluid loop, the secondary fluid loop, or both.

22 Claims, 28 Drawing Sheets

(56) References Cited

U.S. PATENT DOCUMENTS

| | | | |
|---|---|---|---|
| 4,226,288 A | 10/1980 | Collins | |
| 6,212,896 B1 | 4/2001 | Genung | |
| 6,615,601 B1* | 9/2003 | Wiggs | F24T 10/17 62/235.1 |
| 6,742,603 B2 | 6/2004 | Polizzotti et al. | |
| 7,617,697 B2 | 11/2009 | McCaughan | |
| 8,402,780 B2* | 3/2013 | Wiggs | F25B 30/06 62/192 |
| 8,534,069 B2 | 9/2013 | Parrella | |
| 8,881,805 B2 | 11/2014 | Klemencic | |
| 9,453,373 B2 | 9/2016 | Shnell | |
| 9,574,431 B2 | 2/2017 | Wang et al. | |
| 10,422,587 B2 | 9/2019 | Yang | |
| 2003/0121701 A1* | 7/2003 | Polizzotti | C09K 8/05 175/17 |
| 2008/0093125 A1 | 4/2008 | Potter et al. | |
| 2010/0089576 A1 | 4/2010 | Wideman et al. | |
| 2010/0269501 A1* | 10/2010 | Parrella | F24T 10/30 60/641.2 |
| 2012/0043052 A1 | 2/2012 | Heise et al. | |
| 2012/0097448 A1 | 4/2012 | Brice et al. | |
| 2012/0175077 A1* | 7/2012 | Lehmann | E21B 19/24 165/45 |
| 2014/0338315 A1 | 11/2014 | Marks de Chabris | |
| 2015/0021924 A1* | 1/2015 | Parella, Sr. | F03G 7/04 290/1 R |
| 2015/0122453 A1 | 5/2015 | Colwell | |
| 2015/0163965 A1* | 6/2015 | Parrella | F01K 9/003 361/700 |
| 2015/0285226 A1 | 10/2015 | Archambeau et al. | |
| 2015/0354859 A1* | 12/2015 | Marsh | F24T 10/20 165/45 |
| 2016/0053544 A1 | 2/2016 | Ludewigt | |
| 2017/0248345 A1* | 8/2017 | Parrella | F28D 15/0275 |

FOREIGN PATENT DOCUMENTS

| | | |
|---|---|---|
| WO | WO 2012/066403 A1 | 5/2012 |
| WO | WO 2019/042755 A1 | 3/2019 |

OTHER PUBLICATIONS

Altarock Energy.; "Enhance Geothermal Systems (EGS) Fact Sheet." 2014; Retrieved Jun. 15, 2020; 2 Pages.

Carlini et al.; "Down-Hold Heat Exchangers: Modelling of a Low-Enthalpy Geothermal System for District Heating." Mathematical Problems in Engineering; vol. 2012; pp. 11.

Culver et al.; "Downhold Heat Exchangers." GHC Bulletin; Sep. 1999; 11 Pages.

Geiser et al.; "The Radiator-EGS System: A Fresh Solution to Geothermal Heat Extraction." Proceedings, Fourtieth Workshop on Geothermal Reservoir Engineering; Jan. 26-28, 2015; 12 Pages.

Geiser et al.; "Geothermal: The Marginalization of Earth's Largest and Greenest Energy Source." Proceedings $41^{st}$ Workshop on Geothermal Reservoir Engineering; Feb. 22-24, 2016; 16 Pages.

Grant et al.; "Thermal Stimulation of Geothermal Wells: A Review of Field Data." Proceedings, Thirty-Eighth Workshop on Geothermal Reservoir; Feb. 11-13, 2013; 7 Pages.

Hilpert et al.; "The Radiator-Enhanced Geothermal System (RAD-EGS): 3D modeling of heat transfer." Proceedings, $41^{st}$ Workshop on Geothermal Reservoir Engineering; Feb. 22-24, 2016; 12 Pages.

Lund.; "The Use of Downhole Heat Exchangers." Geo-Heat Center, Oregon Institute of Technology, Lamath Falls, OR, USA 97601; 8 Pages.

Meier et al.; "The Potential of Hydrothermal Flames to Induce Spallation in Gneiss." Proceedings World Geothermal Congress 2015 Melbourne, Australia; Apr. 19-25, 2015; 6 Pages.

Nalla et al.; "Parametric Sensitivity Study of Operating and Design Variables in Wellbore Heat Exchangers." INEEL Home of Science and Engineering Solutions; May 2004; 68 Pages.

Oldenburg et al.; "Numerical Simulation of Critical Factors Controlling Heat Extraction from Geothermal Systems Using a Closed-Loop Exchange Method." Proceedings, $41^{st}$ Workshop on Geothermal Reservoir Engineering; Feb. 22-24, 2016; 8 Pages.

Riahi et al.; "Innovative Closed-Loop Geothermal Well Designs Using Water and Super Critical Carbon Dioxide as Working Fluids." Proceedings, $42^{nd}$ Workshop on Geothermal Reservoir Engineering; Feb. 13-15, 2017; 9 Pages.

Wang et al.; "Hydrothermal Spallation Drilling Technology: An Alternative Method of Geothermal Energy Development." Advances in Engineering Research; Atlantis Press; $2^{nd}$ International Conference on Electrical, Automation and Mechanical Engineering (EAME 2017); vol. 84; pp. 302-305.

Wang et al.; "Experimental Study of Hydrothermal Spallation Drilling." MSEE 2018; IOP Publishing; IOP Conf. Series: Material Science and Engineering 472; 2019; 8 Pages.

Woskov.; "Millimeter-Wave Directed Energy Deep Boreholes." Plasma Science and Fusion Center Massachusetts Institute of Technology; Apr. 2017; 11 Pages.

Yekoladio et al.; "Design and optimization of a downhole coaxial heat exchanger for an enhanced geothermal system (EGS)." Renewable Energy; Elsevier; 2013; vol. 55; pp. 128-137.

PCT Application No. PCT/US20/43787 Filing date Jul. 27, 2020 Benjamin Holtzman International Search Report dated Oct. 20, 2020, 15 Pages.

* cited by examiner

GEOTHERMAL HEAT MINING SYSTEM

RELATED APPLICATIONS

This application claims priority to U.S. Provisional Application No. 62/878,578, filed Jul. 25, 2019, which is incorporated herein by reference.

BACKGROUND

Heat in the crust of the Earth offers an effectively inexhaustible, carbon-free energy source that can be used to generate electricity, heat and cool buildings, desalinate water, produce hydrogen fuel and satisfy other human energy needs. However, use of geothermal power is currently limited because of difficulties in reliably tapping large reservoirs, or volumes of the crust containing the targeted thermal energy density. Extracting sufficient geothermal energy to generate electricity economically and reliably is often difficult due to intersections of geological reality and current technical limitations. Many technologies for extracting geothermal energy are only suitable for use in regions of the continental crust that have elevated heat sources, such as magmatic or volcanic heat sources. Additionally, many drilling methods currently in use have a limited depth range.

Most economical geothermal power generation systems are located in unusual geographic settings with highly elevated crustal heat sources, such as volcanic intrusions, surrounded by cracked, permeable, fluid-saturated or steam-saturated rock that can be replenished by fluid injection. Some development has also focused on "enhanced geothermal systems," which involves creating new fracture networks in hot dry rock.

Increasing efficiency and economic predictability of geothermal energy extraction can be useful from several standpoints. Geothermal energy is a renewable source of dispatchable power with sufficient base load qualities to provide electric grid stability. Utilizing geothermal energy may also help to mitigate climate change concerns because the extraction process produces no carbon dioxide. In many processes for extracting geothermal energy, or "heat mining," a fluid is heated while percolating through a permeable fracture network in hot rock. Heated fluid re-emerges at the surface through holes drilled for fluid/vapor recovery. Where permeable fracture networks are not available, fracture networks can be created in "hot dry rock" (HDR), by hydraulic and thermal fracture methods. The drill holes and generated fracture networks in HDR are referred to as "enhanced geothermal systems" (EGS). Some limitations of current EGS methods result from the hydraulic fracture process, as it (1) can reactivate existing faults inducing significant earthquake seismicity (which is true for any geothermal reservoir system); (2) is difficult to control the geometry of the produced fracture network for enhancing the recovery; and (3) can produce relatively large cracks that act as high-flux fluid pathways where the available heat is rapidly diminished. Another limitation of EGS is that it becomes increasingly difficult to drill at greater depths because as the ambient temperature increases, the rocks' increased ductility suppresses the fracture formation necessary for the mechanical drilling process, along with other technical difficulties. Almost all approaches involve drilling multiple holes, for either injection and production separately, expanding the drilling costs and uncertainty in the production of fracture networks to connect the injection and production boreholes. Despite advances in EGS and other geothermal technologies, challenges remain to cost-effective and reliable recovery of heat from geothermal reservoirs to produce electricity. Furthermore, the efficiency of the wide range of turbine generators depends strongly on the temperature of the recovered fluid/vapor from the reservoir. An important target is the extraction of supercritical fluids because the generator efficiency increases significantly.

SUMMARY

The present disclosure describes systems, devices, and methods for extracting geothermal energy, also known as geothermal heat mining. A geothermal heat mining system can include a single primary borehole extending from the surface into a geothermal reservoir. A primary fluid loop can include a cold working fluid line leading into the primary borehole and a hot working fluid line coming out of the primary borehole. A secondary fluid loop can be located down the primary borehole. The secondary fluid loop can be in thermal contact with the geothermal reservoir. The system can also include a downhole heat mining device to control a rate of heat transfer from the secondary fluid loop to the primary fluid loop by selectively controlling fluid flow through the primary fluid loop, the secondary fluid loop, or both.

A downhole geothermal heat mining device can include a device body shaped to be lowered down a primary borehole, a cold working fluid inlet, a hot working fluid outlet, and a controller. The cold working fluid inlet can be connectable to a cold working fluid line that leads down the primary borehole. The hot working fluid outlet can be connectable to a hot working fluid line that leads up the primary borehole. The cold working fluid line and the hot working fluid line can form a primary fluid loop. The controller can be adapted to control a rate of heat transfer to the primary fluid loop from a secondary fluid loop. The secondary fluid loop can be located down the primary borehole, and the secondary fluid loop can be in thermal contact with a geothermal reservoir. The controller can control the rate of heat transfer by selectively controlling fluid flow through the primary fluid loop, the secondary fluid loop, or both.

A geothermal heat mining method can include forming a single primary borehole, placing a geothermal heat mining device downhole in the primary borehole, forming a primary fluid loop comprising a cold working fluid line leading into the primary borehole and a hot working fluid line coming out of the primary borehole, forming a secondary fluid loop located down the primary borehole, where the secondary fluid loop is in thermal contact with the geothermal reservoir, transferring heat from the secondary fluid loop to an energy storage or production unit outside the primary borehole via the primary fluid loop, and controlling a rate of heat transfer from the secondary fluid loop to the primary fluid loop by selectively controlling fluid flow through the primary fluid loop, the secondary fluid loop, or both.

Although multiple vertical (primary) boreholes can be used, this technology allows for geothermal heat mining from each vertical borehole in such multi-borehole systems. Such an approach can reduce or eliminate difficulties regarding fluid permeability through rock between adjacent primary vertical boreholes. Furthermore, any number of additional secondary boreholes can be formed from the vertical boreholes at corresponding target reservoir depths. Thus, a system can be comprised of multiple primary boreholes feeding into a energy conversion system, but those primary boreholes are not connected to each other in the subsurface reservoir, eliminating difficulties regarding control of fluid flow through rock connecting adjacent boreholes.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
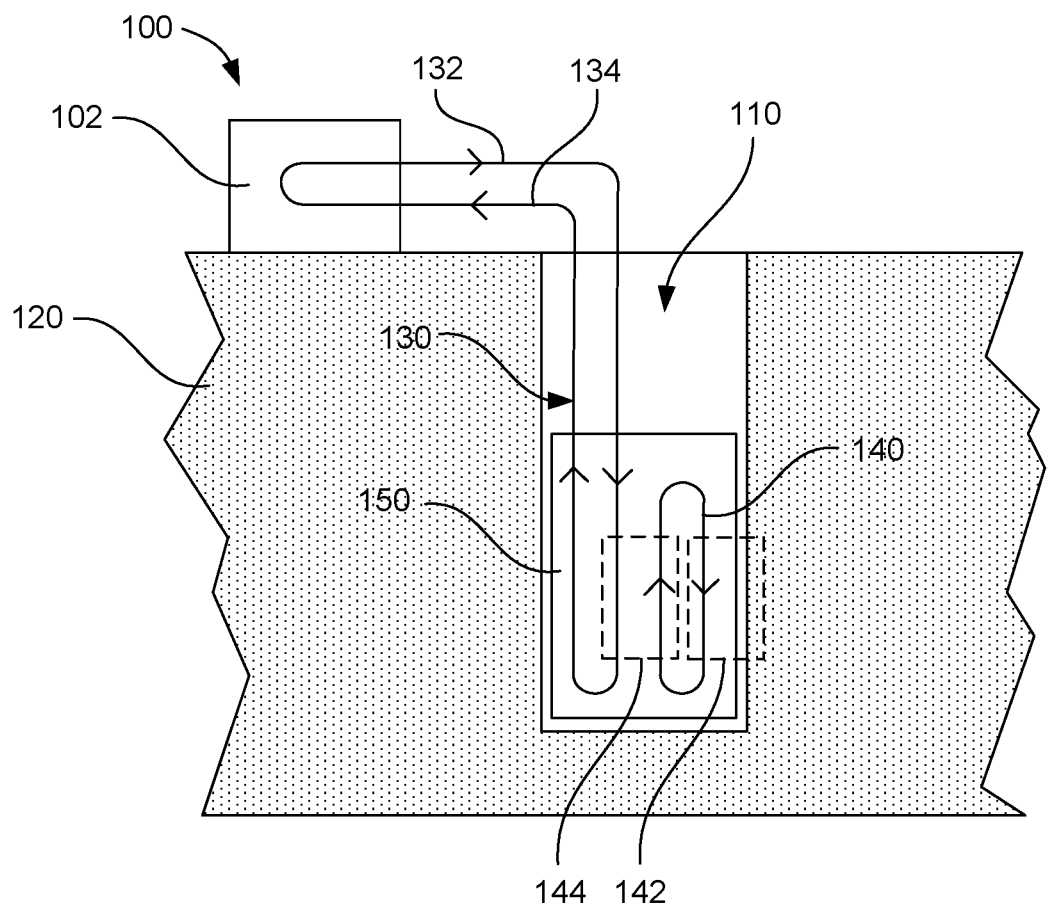
FIG. 1 is a schematic illustration of an example geothermal heat mining system in accordance with an embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The term "geothermal" is used to refer to any heat present under the surface of the Earth. Geothermal energy can include heat at a wide range of temperatures, which can be present over a wide range of depths under the surface of the Earth. As used herein, a "geothermal reservoir" refers to a region under the surface of the Earth that has a sufficiently high temperature (or thermal energy density) to allow useful heat energy to be produced from the region. Typically, the geothermal reservoir can be natively heated or in other words contains heat provided by the Earth (i.e. thermal energy flowing from Earth's deep interior towards the surface) rather than introduced from a surface heat source. Geothermal reservoirs can include rock with fluid present in fractures and/or other forms of porosity, or without such porosity ("wet" or "dry", respectively). For example, wet geothermal reservoirs can include underground aquifers or hot wet rock (HWR) at a sufficiently high temperature to produce heat energy therefrom. Dry geothermal reservoirs can include hot dry rock (HDR), which can be a rock formation containing little or no fluid. The systems described herein can be effectively used in either HWR or HDR. Lateral borehole embodiments can be used to access heat adaptively in either HWR or HDR (or mixed/permeability and fluid content varying in time and space). In either case, this system may be implemented over a wide range of target temperatures, but is intended in particular for use in geothermal reservoirs at very high temperature targets (>350° C.). Although this system can be particularly useful in electricity generation, other applications can include but are not limited to, energy storage through production of hydrogen fuel (electrolysis), direct production of steam, direct heating, and the like.

As used herein, "thermal contact" can refer to a functional connection between two objects or fluids that allows heat to be transferred from one object or fluid to the other. In some examples, thermal contact can be established by direct, physical contact. For example, water injected directly into fractures in a hot dry rock formation can be in thermal contact with the hot dry rock because heat is transferred from the hot dry rock to the water while they are in direct physical contact. In other examples, thermal contact can be established without direct physical contact, but where an intermediate medium is present that can conduct heat. For example, water can be enclosed within a pipe that is in physical contact with the hot dry rock. The water can be in thermal contact with the hot dry rock because heat can be conducted from the hot dry rock, through the pipe wall, to the water without direct physical contact between the water and hot dry rock.

As used herein, "fluidly connected" can refer to bodies of fluids, fluid lines, or fluid containers that are connected physically in a way that allows mass transfer of fluids from one to another. Similarly, "fluidly isolated" can refer to bodies of fluid, fluid lines, or fluid containers that are separate so that no fluid can be transferred from one to another.

As used herein, whenever any property is referred to that can have a distribution between differing values, such as a temperature distribution, pore size distribution, etc., the property being referred to represents an average of the distribution unless otherwise specified.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. However, unless otherwise enunciated, the term "about" generally connotes flexibility of less than 5%, and in some cases less than 2%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained.

"Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Geothermal Heat Mining Systems

The present disclosure describes systems and methods for extracting geothermal energy. In various examples, the systems and methods can provide increased efficiency and control over the geothermal energy production. In some examples, the systems and methods can utilize a single borehole, which can reduce drilling compared to systems that utilize separate boreholes for injection and production. The systems and methods can enable energy production from hot dry rock without hydraulic fracturing, or with minimal hydraulic fracturing. Therefore, the systems and methods can reduce induced seismicity compared to processes that include more hydraulic fracturing. In certain examples, the systems and methods described herein can allow for drilling a borehole and beginning to produce geothermal from the borehole while simultaneously drilling the borehole deeper. This capability can allow for a faster start of energy production while also drilling deeper to access more of a geothermal reservoir, at increasingly high temperatures. The systems and methods can also be successfully used to access geothermal reservoirs at greater depths and higher temperatures than many other geothermal production processes.

In some examples, a geothermal heat mining system can include a single primary borehole in a geothermal reservoir. A primary fluid loop can be made up of a cold working fluid line leading into the primary borehole and a hot working fluid line coming out of the primary borehole. The system can also include a secondary fluid loop located down the primary borehole. The secondary fluid loop can be in thermal contact with the geothermal reservoir. The system can also include a downhole heat mining device that can be used to control a rate of heat transfer from the secondary fluid loop to the primary fluid loop by selectively controlling fluid flow through the primary fluid loop, the secondary fluid loop, or both. In further detail, controlling the rate of fluid flow through the secondary can include cycling a fluid into thermal contact with the geothermal reservoir so that the fluid can be heated by the geothermal reservoir. The rate at which heat is transferred from the geothermal reservoir to the fluid in the secondary fluid loop can depend on a variety of factors, such as the flow rate of fluid through the secondary fluid loop, the relative temperatures of the fluid in the secondary fluid loop and the geothermal reservoir, the presence of any materials physically separating the fluid from the geothermal reservoir, the local structure of the rock adjacent to the fluid-rock interface (for example, porosity and fracture density and geometry, that influence the effective permeability and effective heat transfer processes), and so on. Additionally, in various examples the secondary fluid loop can be in thermal contact with the primary fluid loop, or the secondary fluid loop can be selectively brought into thermal contact with the primary fluid loop. In some examples, the downhole heat mining device can adjust the flow rates of fluid in the primary flow loop and the secondary flow loop to control the rate of heat transfer to the primary fluid loop. Heat transferred to the primary fluid loop can be used on the surface to generate electricity, or for direct heating, hydrolysis to produce hydrogen fuel, or any purpose for which geothermal energy can be used.

FIG. 1 shows one example geothermal heat mining system 100. This system includes a single primary borehole 110 in a geothermal reservoir 120. A primary fluid loop 130 includes a cold working fluid line 132 leading into the primary borehole and a hot working fluid line 134 coming out of the primary borehole. In this example, the hot working fluid line is used to power a generator 102 on the surface. A secondary fluid loop 140 is located down the primary borehole. The secondary fluid loop is in thermal contact with the geothermal reservoir. This thermal contact is represented by the dotted box 142. The secondary fluid loop can also be in thermal contact with the primary fluid loop. This thermal contact is represented by the dotted box 144. The system can also include a downhole heat mining device 150 that can control a rate of heat transfer from the secondary fluid loop to the primary fluid loop by selectively controlling fluid flow through the primary fluid loop, the secondary fluid loop, or both. In various examples, the system can include a variety of different arrangements and designs of boreholes, fluid loops, downhole heat mining devices, and so on. Several examples are described in more detail below.

Hot rock in geothermal reservoirs can, in some cases, be depleted of heat in a local area where heat is being extracted. For example, the secondary fluid loop can be used to transfer heat from the geothermal rock to fluid in the secondary fluid loop. If the rate of heat transfer from the rock to the fluid exceeds the speed at which heat can be conducted from surrounding rock to the location of the secondary fluid loop, then the rock may become cooler in the local region of the secondary fluid loop. In some examples, the rate of fluid flow in the secondary fluid loop can be controlled so that the heat transfer is not too fast and the local surrounding rock does not become cooled to a temperature at which the heat is no longer useable. In other examples, the system can include multiple secondary fluid loops in different locations in the geothermal reservoir. The rock can cool down as heat is extracted by one of the secondary fluid loops. When the rock cools to a specified threshold temperature (i.e. depletion temperature), the fluid flow in that particular secondary loop can be reduced or stopped to allow the temperature of the geothermal rock in the location of that secondary fluid loop to increase by thermal diffusion from adjacent rock volume of the geothermal reservoir. Although conditions may vary depending on surface equipment, heating fluids, and desired target temperatures, typical depletion temperatures can range from about 150° C. to about 400° C., and often below about 300° C. As a general guideline, exit temperatures (i.e. at the surface) can be above about 150° C. in order to generate electricity using standard current turbine systems, and in some cases about 400° C. or greater. Another secondary fluid loop can simultaneously be activated to compensate for the lost production of heat from the secondary fluid loop that was temporarily paused. In some examples, the system can include a sufficient number of secondary fluid loops so that geothermal energy can be continuously produced within a target range of mass rate and exit temperature. Additionally, the amount of geothermal energy produced can be control by controlling fluid flow rate through the multiple secondary fluid loops and through the primary loop.

In some examples, the primary fluid loop and the secondary fluid loop can be fluidly isolated one from another, meaning that the fluid flowing in the secondary loop does not physically cross over into the primary fluid loop, or vice versa. In these cases, heat can be transferred from the secondary fluid loop to the primary fluid loop, for example through a heat exchanger. In other words, the heat exchanger is physically oriented downhole within a housing of the downhole heat mining device. In certain examples, the downhole heat mining device can include a heat exchanger connected to the primary fluid loop and the secondary fluid loop. The heat exchanger can have a hot side and a cold side. The hot side can be connected to the secondary fluid loop and the cold side can be connected to the primary fluid loop. Heat can be conducted from the secondary fluid loop on the hot side, through the heat exchanger to the primary fluid loop on the cold side. In certain examples, the downhole heat mining device can also include a pump to control the fluid flow rate through the secondary fluid loop. In one example, insulation can be selectively oriented within the mining device in order to minimize heat loss across the inlet and outlet pipes to and from the surface.

Figure 2:
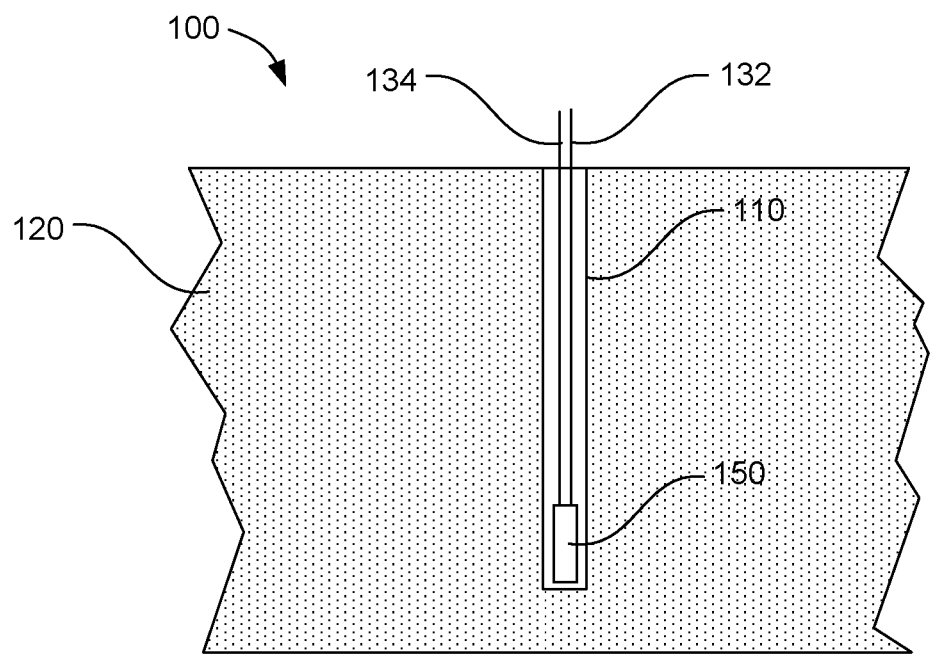
FIG. 2 is another schematic illustration of an example geothermal heat mining system in accordance with an embodiment of the present invention.

FIG. 2 shows an example geothermal heat mining system 100 that includes a downhole heat mining device 150 that includes a secondary fluid loop contained within the heat mining device (also illustrated in FIG. 1). A cold working fluid line 132 leads down the primary borehole 110 to the heat mining device, and a hot working fluid line 134 leads up from the heat mining device to the surface.

Figure 3A:
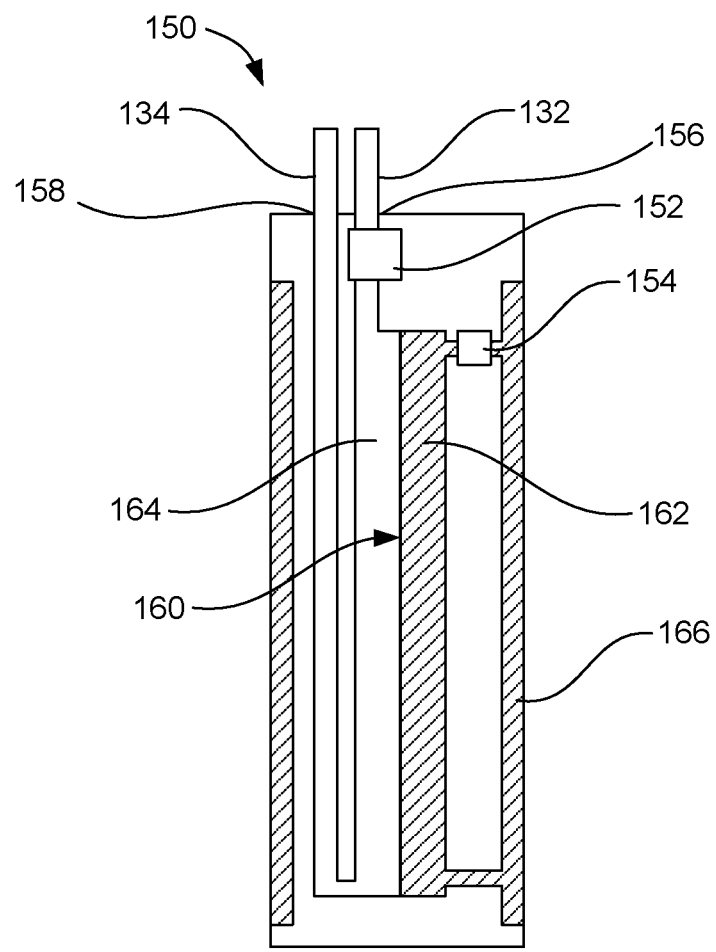
FIG. 3A is a side cross-sectional view of an example downhole heat mining device in accordance with an embodiment of the present invention.

FIG. 3A shows an expanded, cross-sectional side view of a downhole heat mining device 150. A cold working fluid line 132 leads into a cold working fluid inlet 156 in the top of the heat mining device, and a hot working fluid line 134 leads out of a hot working fluid outlet 158 in the top of the heat mining device. In this example, the heat mining device includes a first pump 152 for circulating fluid in the primary fluid loop by pumping fluid from the cold working fluid line into the device toward the hot working fluid line. The device also includes a heat exchanger 160. The heat exchanger has a hot side 162 and a cold side 164. In this example, the cold working fluid line leads to the cold side of the heat exchanger. The hot side of the heat exchanger is connected to an outer shell fluid flow chamber 166, which optionally can be in thermal contact with the surrounding rock, so as to operate as a secondary heat exchanger. The hot side of the heat exchanger and the outer shell fluid flow chamber together make up the secondary fluid loop in this example. Thus, the secondary fluid loop is fluidly isolated from the primary fluid loop and contained within the heat mining device. The device also includes second pump 154 for circulating fluid in the secondary fluid loop. The fluid in the secondary fluid loop can draw heat from the geothermal reservoir surrounding the heat mining device. In certain examples, the outer shell fluid flow chamber can include features to increase heat transfer, such as coils, fins, tubes, baffles, and so on. In one example, the outer shell fluid flow chamber can include a coil or corkscrew-shaped flow pathway to increase the surface area and the time that fluid is in contact with the hot outer shell of the heat mining device. For example, flowing through tubing coiled around the inner surface of the exterior shell. This configuration can extract heat from the surrounding rock (a thermal perturbation will induce local convection of fluid in connected porosity in the surrounding rock or in free fluid situated in between the device and the rock, both enhancing heat extraction. This example can extract useable thermal energy to the surface and also to lower the ambient temperature inside the device, to enhance the operability of electronics and mechanical machinery inside the device.

Figure 3B:
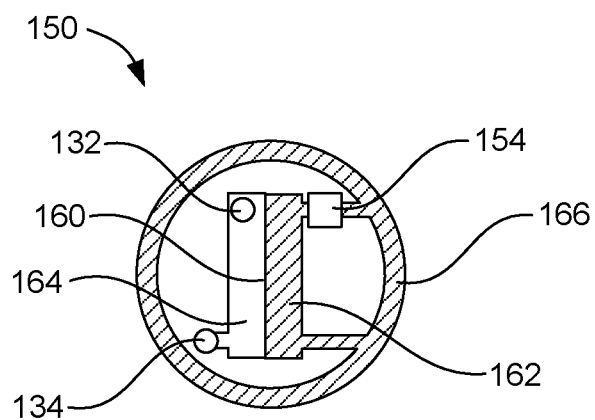
FIG. 3B is a top cross-sectional view of an example downhole heat mining device in accordance with an embodiment of the present invention.

FIG. 3B is a top-down cross-sectional view of the example heat mining device 150 shown in FIG. 3A. As shown in this view, the heat exchanger 160 is located inside the device, with the cold working fluid line 132 and the hot working fluid line 134 connected to the cold side 164 of the heat exchanger. The hot side 162 of the heat exchanger is connected to the outer shell fluid flow chamber 166 to form the secondary fluid loop. The heat mining device can control the rate at which heat is transferred to the primary fluid loop by controlling the flow rates of fluid through the primary fluid loop and the secondary fluid loop.

The heat exchanger shown in the above figures is depicted as a simple design having two chambers separated by a wall. However, any type of suitable heat exchanger can be used to effectively transfer heat from the secondary fluid loop to the primary loop. In various examples, the heat exchanger can include a concurrent flow, countercurrent flow, cross flow, or hybrid flow heat exchanger. In further examples, the heat exchanger can include a shell and tube heat exchanger, a double pipe heat exchanger, a plate heat exchanger, or another suitable heat exchanger.

In other examples, geothermal heat mining systems can include a secondary fluid loop that passes through the geothermal reservoir itself, rather than being fully contained within the downhole heat mining device. Flow pathways can be formed that branch outward from the primary borehole and the secondary fluid loop can include these flow pathways. In certain examples, the system can include a lateral secondary borehole formed in the geothermal reservoir extending out from the primary borehole. In some cases, the lateral secondary borehole can be at a 90° angle with the primary borehole. However, in other examples, the lateral secondary borehole can be angled upward or downward. Accordingly, the term "lateral" is not limited to perfectly horizontal boreholes, and the secondary boreholes can be formed at a variety of angles with respect to the primary borehole.

In certain examples, two lateral boreholes can be formed that extend out from the primary borehole, and the direction of the secondary boreholes can be such that the secondary boreholes meet one another after passing some distance through the geothermal reservoir. Both of these secondary boreholes can be connected as parts of the secondary fluid loop, so that fluid in the loop flows out of the heat mining device, through the geothermal reservoir, and back into the heat mining device.

Figure 4:
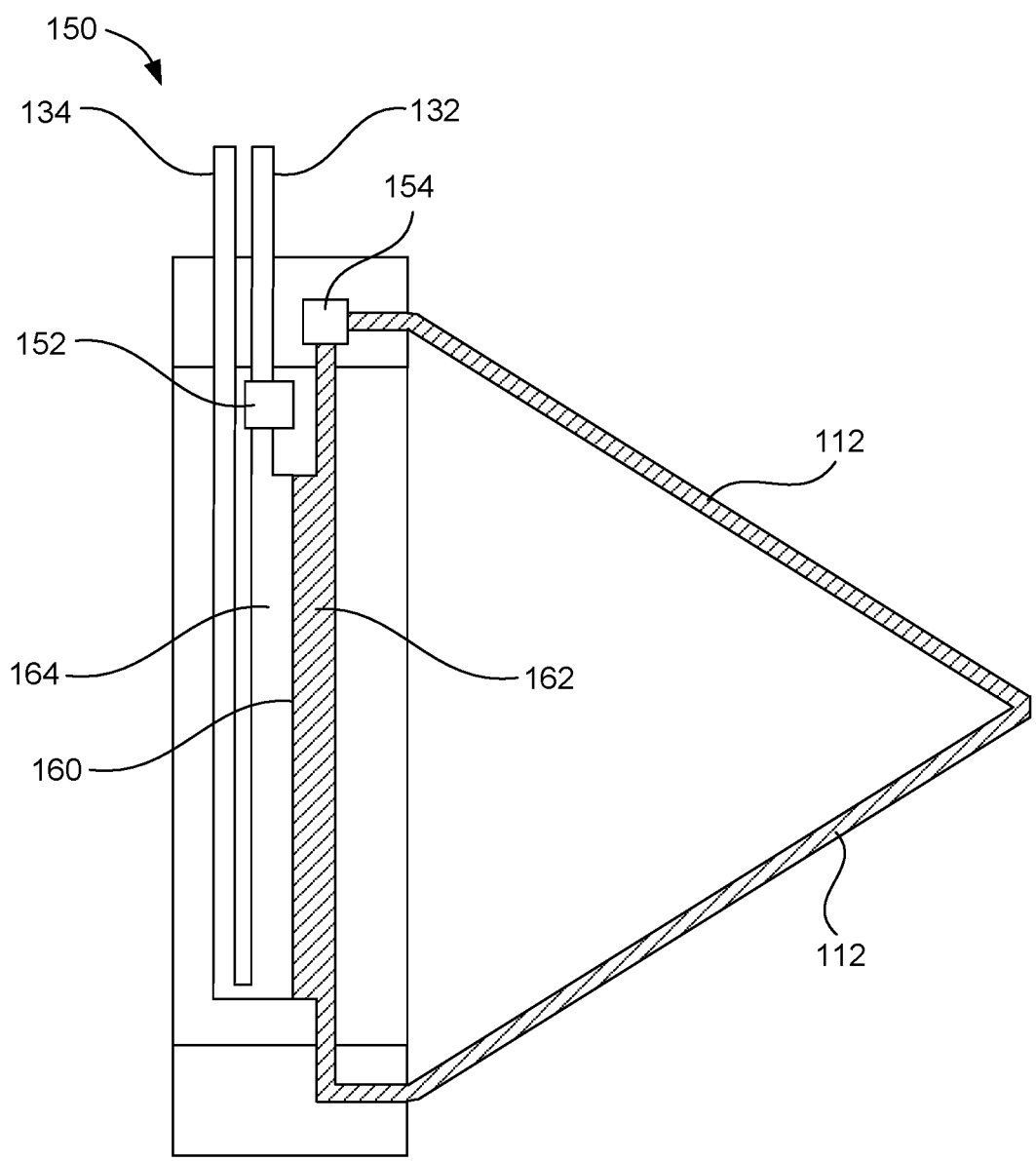
FIG. 4 is a side cross-sectional view of another example downhole heat mining device including angled lateral secondary boreholes in accordance with an embodiment of the present invention.

FIG. 4 shows a side cross-sectional view of another example downhole heat mining device 150 with angled lateral secondary boreholes. This example includes a heat exchanger 160 as in the previous example. The heat exchanger includes a hot side 162 and a cold side 164. The cold side is connected to a cold working fluid line 132 and a hot working fluid line 134. A first pump 152 can circulate working fluid from the cold working fluid line to the hot working fluid line. This system also includes lateral secondary boreholes 112 that extend out from the primary borehole into the geothermal reservoir. The lateral secondary boreholes in this example are angled with respect to the primary boreline so that the secondary boreholes meet and form a fluid pathway. The secondary boreholes are connected to the hot side of the heat exchanger to form a secondary fluid loop. A second pump 154 can be used to circulate fluid through the secondary fluid loop.

Figure 5:
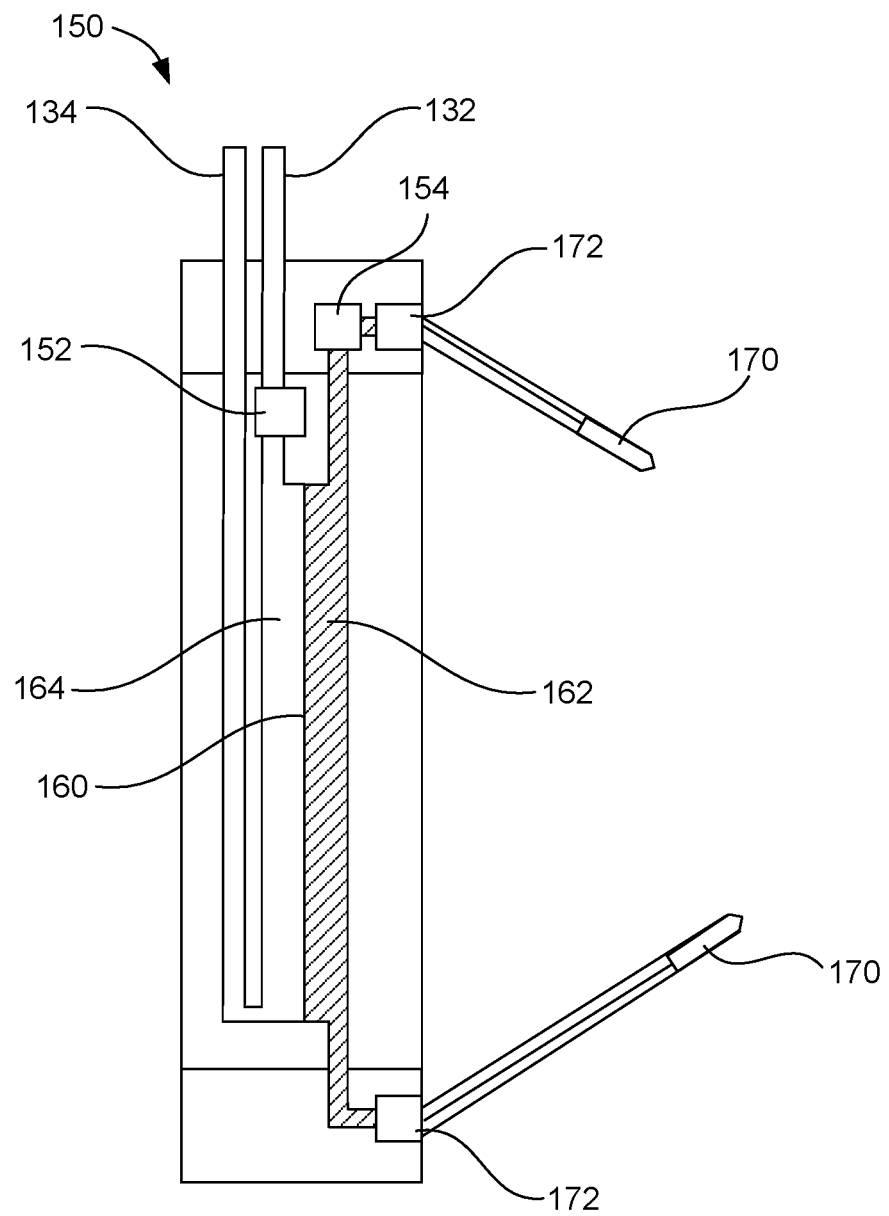
FIG. 5 is a side cross-sectional view of another example downhole heat mining device in accordance with an embodiment of the present invention.

FIG. 5 shows an example downhole heat mining device 150 that can be used to form lateral secondary boreholes such as those shown in FIG. 4. The heat mining device includes lateral drilling heads 170 that are oriented outward from the heat mining device. The lateral drilling heads can be controlled and/or launched from secondary drilling units 172 and tethered to a portion of the secondary drilling unit by lines bringing power and/or fluid to the drilling unit. The lateral drilling heads can be extended outward to drill secondary boreholes transverse to the primary borehole. Again, the secondary boreholes can be drilled at a variety of angles from the primary borehole. Therefore, the term "transverse" is not limited to secondary boreholes that are at a 90° angle from the primary borehole. In some examples, the lateral drilling heads can be steerable so that the direction of drilling can change to form curved secondary boreholes. This example heat mining device can also connect the lateral secondary boreholes, after they have been drilled, to the hot side 162 of the heat exchanger 160 to form the secondary fluid loop. The secondary fluid loop can transfer heat to the primary fluid loop, which includes the cold working fluid line 132, the cold side 164 of the heat exchanger, and the hot working fluid line 134. Methods and devices for fluidly connecting the secondary boreholes to the fluid lines and plumbing within the device are described in more detail in text associated with FIG. 14. Any operating device has the capability to install the necessary connections and plumbing, by a range of methods including transferring pre-built components through a mechanical connection ("component transport line") from the surface and/or 3D printing components within the device, including mechanisms to install, fit, and seal the components.

Although the example including secondary lateral boreholes has been shown with a single secondary fluid loop, other examples can include systems with multiple secondary fluid loops. For example, the downhole heat mining device can drill several lateral secondary boreholes to form multiple secondary fluid loops at a common depth, at multiple different depths, or both. In some examples, the downhole heat mining device can include valves or pumps to simultaneously control fluid flow through the multiple secondary fluid loops, or the device can selectively flow fluid through the secondary fluid loops one at a time or in any sequence, with the aim of optimizing the heat extraction and the duration of the viability of the reservoir. Although stated above with respect to the brief description of the drawings, it is emphasized that scale in these drawings is only for clarity in illustration and do not represent typical wellbore and device dimensions. For example, the primary borehole may be 20 cm diameter, while the lateral loops may be hundreds of meters long.

Figure 6:
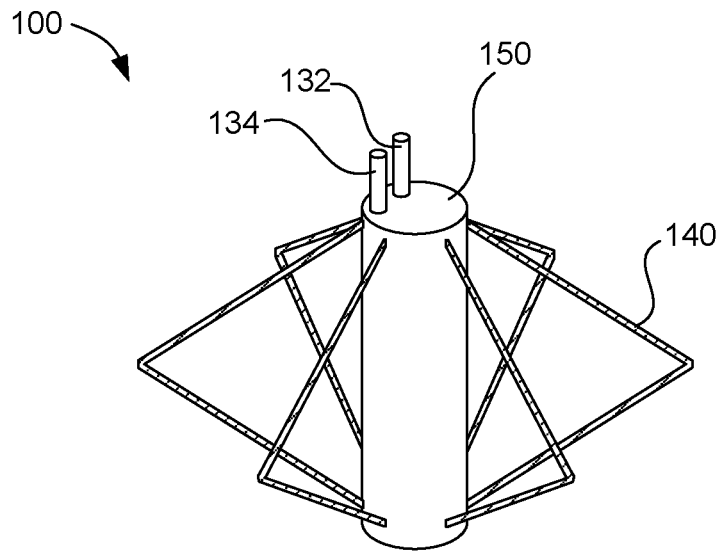
FIG. 6 is a schematic illustration of another example geothermal heat mining system including multiple lateral secondary fluid loops in accordance with an embodiment of the present invention.

FIG. 6 shows an example geothermal heat mining system 100 that has multiple secondary fluid loops 140 that are formed by drilling lateral secondary boreholes outward from the primary borehole. In this example, the secondary fluid loops are arranged in a 6-loop star pattern radiating outward from a downhole heat mining device 150. In some examples, the downhole heat mining device can include multiple lateral drilling heads so that all of the secondary boreholes can be formed simultaneously. In other examples, one or two lateral drilling heads can be used to drill secondary boreholes, and then the downhole heat mining device can rotate to drill additional boreholes in a different direction. In further examples, additional arrays of secondary boreholes can be formed above (i.e., further up the primary borehole) and/or below (i.e., further down the primary borehole) at varying depths. The spacing and distribution of these secondary fluid loops can vary considerably depending on thermodynamic and economic considerations, including the desired heat recovery, the desired duration, which will depend upon rock type, rock porosity, depth, reservoir temperatures (which can vary by depth and radial direction), borehole diameters, and other factors.

Figure 7:
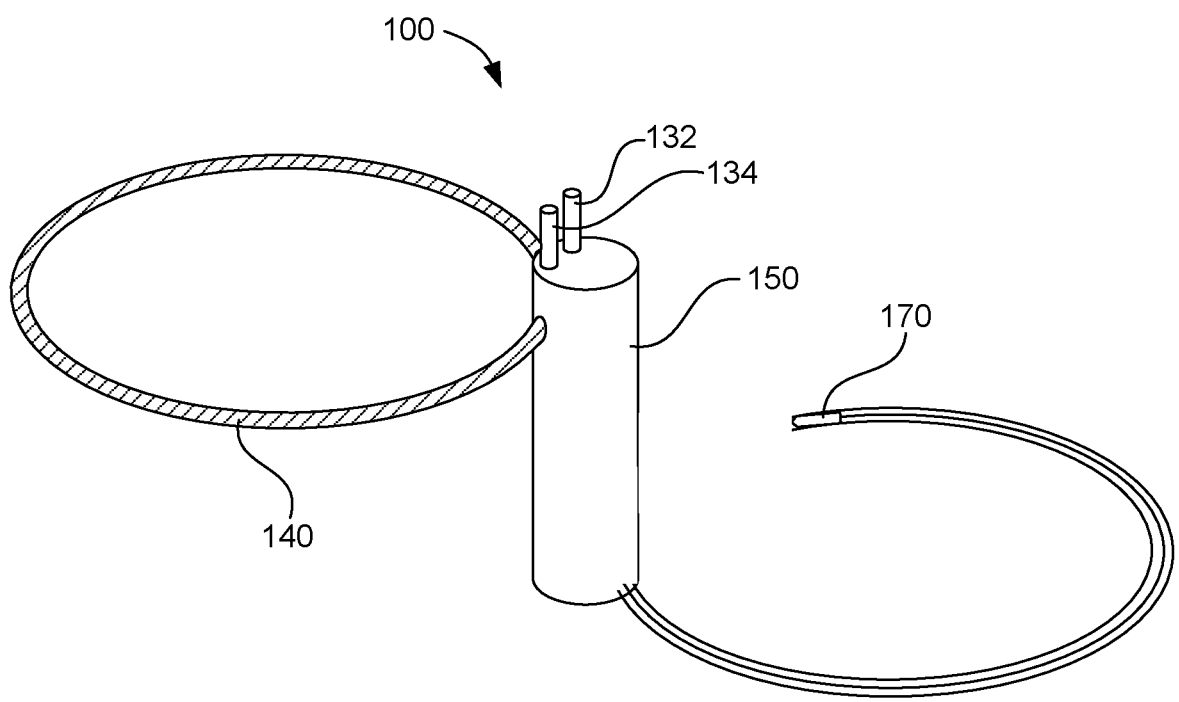
FIG. 7 is a schematic illustration of another example geothermal heat mining system with one completed secondary fluid loop and the formation of another secondary fluid loop in progress in accordance with an embodiment of the present invention.

FIG. 7 shows a different example geothermal heat mining system 100 that also has multiple secondary loops 140. In this example, the secondary loops include curved lateral secondary boreholes. The curved secondary boreholes can be formed using a steerable lateral drilling head 170. A steerable lateral drilling head can drill a secondary borehole having a curved loop shape, and then the downhole heat mining device can connect both ends of the curved secondary borehole to the secondary fluid loop. Each of the curved secondary boreholes can form a single, separate secondary fluid loop. If operable in the particular conditions, lateral boreholes can be drilled by existing mechanical drilling heads (diamond or other drill bit material), thermal/flame spallation drilling, hydrothermal spallation (fluid jets of hot or cold water) drilling, metal shot abrasive drilling, chemically enhanced drilling, or other technologies. Hydrothermal spallation can be particularly useful at very high temperature conditions and is described below.

In further examples, secondary fluid loops can incorporate fractures in the geothermal formation near the primary borehole. In some examples, the primary borehole can be drilled into a region of the geothermal formation that includes microfractures distributed throughout the formation. In such examples, the downhole heat mining device can be used to drill lateral secondary boreholes outward from the primary borehole. These lateral secondary boreholes can be part of a secondary fluid loop, in which fluid is pumped into one lateral secondary borehole to percolate through the microfractures and then the fluid can flow through a second lateral secondary borehole back into the heat mining device.

In examples where the geothermal formation includes a large number of microfractures in all directions from the primary borehole, the lateral secondary boreholes can be drilled in any direction to access the microfractures. In other examples, local pockets of microfractures can be present in the geothermal formation. Lateral secondary boreholes can be drilled in the appropriate direction to reach these local pockets of microfractures. A first lateral secondary borehole can be formed for pumping fluid into the pocket of microfractures, and a second lateral secondary borehole can be formed for producing (or recovering) the fluid out of the pocket of microfractures. In further examples, microfractures can be created in the geothermal formation using a suitable fracturing method. In certain examples, the downhole heat mining device and/or the lateral drilling heads can include micro-damage heads that can create microfractures in the surrounding rock. The micro-damage heads can form microfractures by mechanical damage (e.g. spinning masses hitting the rock surface), cold spallation fracturing, hydraulic pressure fracturing, sonic fracturing, or other existing methods.

In some examples, the lateral drilling heads can include a passage for propelling fluid out of the lateral drilling head into the surround rock. In certain examples, fluid can be propelled out perpendicular to the direction that the lateral drilling head is drilling. Propelling a fluid at a steady or pulsed high pressure into the surround rock can create small fracture networks that propagate into the rock. In some examples a small hole can be drilled first to begin propagation of the fractures. The fractures can form a "focused fracture network," which can locally surround the lateral secondary borehole or which can intersect with other secondary boreholes or fracture networks around other secondary boreholes.

Figure 8:
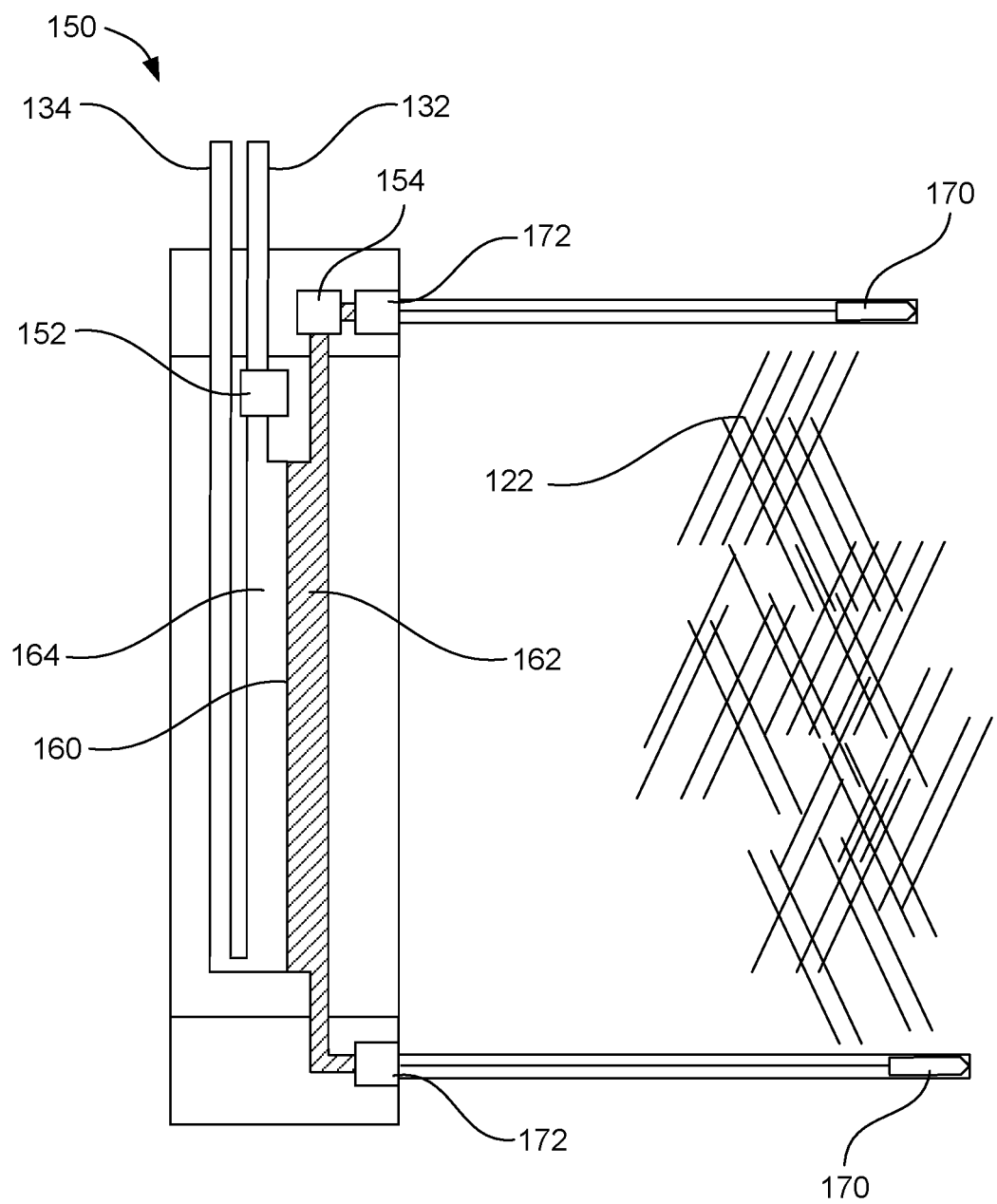
FIG. 8 is a side cross-sectional view of another example downhole heat mining device where fractured formation forms part of a secondary fluid loop in accordance with an embodiment of the present invention.

FIG. 8 shows one example downhole heat mining device 150 in the process of forming lateral secondary boreholes into a pocket of microfractures 122. In this example, lateral drilling heads 170 start drilling at secondary drilling units 172 and drill lateral secondary boreholes into the geothermal formation. One drilling head drills into the top of the region of formation containing microfractures. The other drilling head drills into the bottom of the region of formation containing microfractures. After drilling the lateral secondary boreholes, the drilling heads can be retracted into the secondary drilling units. Then, a pump 154 can be used to pump fluid into one lateral secondary borehole. The fluid can then pass through the microfractures to the other lateral secondary borehole. Therefore, the lateral secondary boreholes and the microfracture network are parts of the secondary fluid loop. Similar to the other examples shown above, heat from the secondary fluid loop can be transferred to the primary fluid loop through a heat exchanger 160.

Another method that can be used to form secondary fluid loops in the geothermal reservoir can involve forming tertiary boreholes that extend from the secondary boreholes. In some examples, the downhole heat mining device can include secondary drilling units with lateral drilling heads that can be extended outward from the heat mining device. In certain examples, the lateral drill heads can also include tertiary drilling units, with tertiary drilling heads. The tertiary drilling heads can be smaller than the secondary lateral drilling heads. In some examples, two secondary lateral boreholes can be formed, and then tertiary boreholes can be formed extending from the secondary boreholes. These tertiary boreholes can connect to each other, or to the other secondary borehole, or the tertiary boreholes can increase the porosity of the geothermal rock, or nucleate networks of thermal-hydraulic fractures, so that fluid can pass through to the other secondary borehole. In some examples, multiple tertiary boreholes can be formed connecting two secondary boreholes. Additional tertiary boreholes can increase the surface area of geothermal rock contacted by fluid flowing through the secondary fluid loop. This level of multi-scale drilling can increase the rate of heat transfer from the geothermal rock to the fluid.

Figure 9:
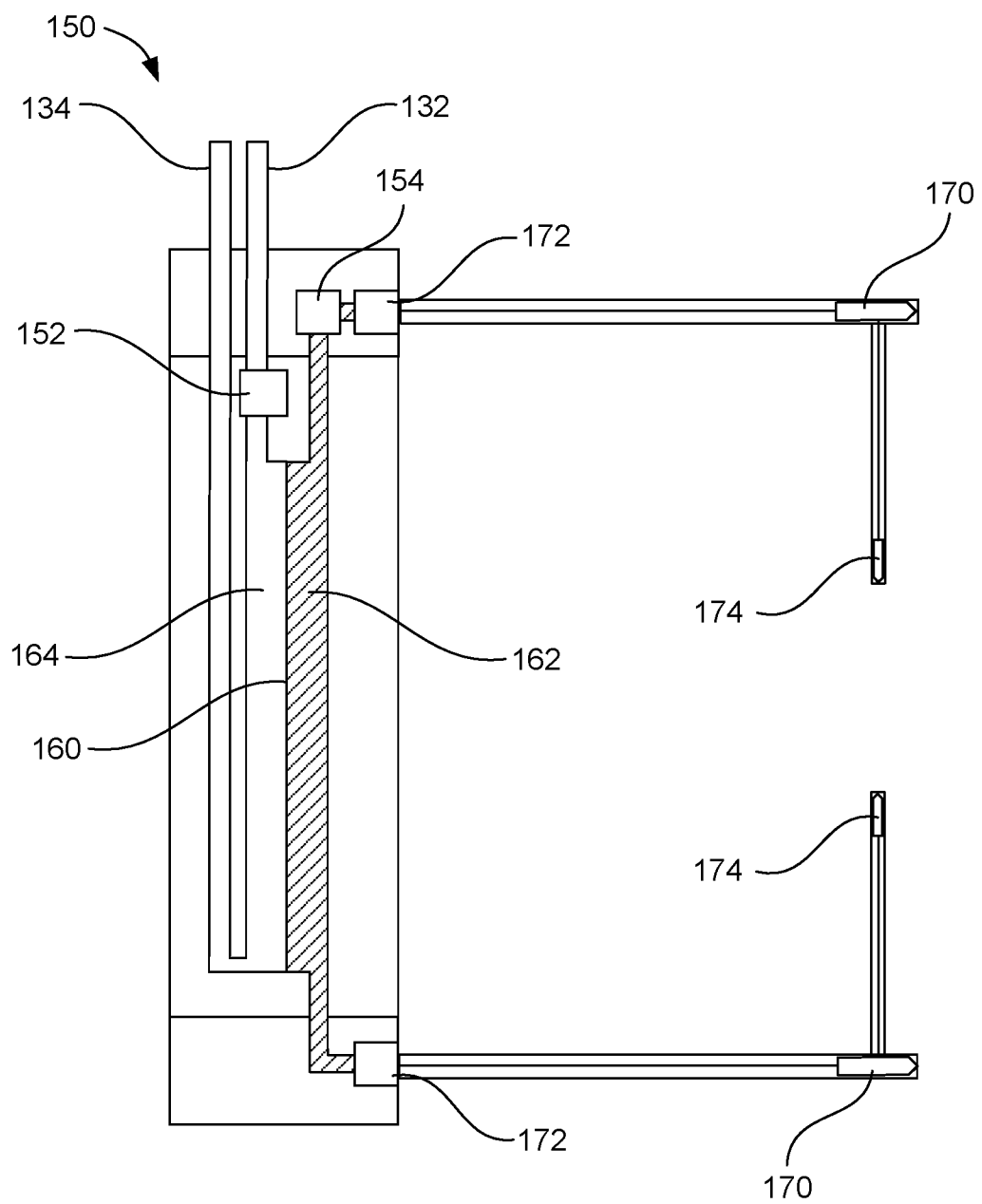
FIG. 9 is a side cross-sectional view of another example downhole heat mining device including tertiary drilling in accordance with an embodiment of the present invention.

FIG. 9 shows an example downhole heat mining device 150 that can form tertiary boreholes extending from secondary lateral boreholes. The device includes lateral drilling heads 170 that can extend from secondary drilling units 172 to form lateral secondary boreholes in the geothermal formation. After drilling a distance into the geothermal formation, the lateral drilling heads can deploy tertiary drilling heads 174 that can drill another borehole outward from the secondary borehole. In this example, two tertiary drilling heads are used to drill a tertiary borehole that connects the secondary boreholes. In another example, the tertiary drilling heads can be retracted after forming the tertiary borehole, and then the tertiary drilling heads can be used again multiple times to form multiple tertiary boreholes connecting the secondary boreholes. The secondary boreholes and tertiary boreholes can form the secondary fluid loop, which can transfer heat to the primary fluid loop through a heat exchanger 160 as in the examples described above.

In further examples, geothermal heat mining systems can include a processor to help control fluid flow through the primary fluid loop and the secondary fluid loop or loops. As mentioned above, in some examples the downhole heat mining device can include a pump to pump fluid through the secondary fluid loop. In other examples, the downhole heat mining device can also include a pump for pumping fluid through the primary fluid loop, although this can also be performed by a pump at the surface. The operation of these pumps can be controlled, in some examples, by control signals from a processor. In one example, the processor can be integrated in the downhole heat mining device. In another example, the processor can be outside the primary borehole, such as on the surface. The processor can send control signals which can be received by the downhole heat mining device to control the pumps. In further examples, the processor can generate control signals to control a variety of other actions of the downhole heat mining device, such as drilling, steering the steering drilling heads, activating micro-damage heads, opening and closing valves, moving up and down in the primary borehole, rotating the heat mining device, and so on.

The geothermal heat mining systems can also include sensors. In some examples, the processor described above can be connected to sensors to receive information about the geothermal formation, boreholes, fluids in the primary and secondary fluid loops, including local rock and fluid temperatures, stress in the rock, pressure in the fluid, elastic vibrations due to microseismicity, electrical conductivity, and any other pertinent information. For example, the sensors can include temperature sensors to measure the temperature of fluids in the primary fluid loop or secondary fluid loop. Temperature sensors can also be placed to measure the temperature of the geothermal rock in various locations. Other types of sensors that can be used can include pressure sensors, position sensors, and combinations of these types of sensors. In certain examples, the processor can be programmed to generate control signals to instruct the heat mining device to take appropriate actions based on the information provided by the sensors. For example, the processor can speed up fluid flow in a secondary fluid loop if additional heat transfer to the primary fluid loop is desired. In another example, the processor can slow down fluid flow in a secondary fluid loop if the temperature of the geothermal formation has decreased below a predetermined threshold (e.g. the depletion temperature) to allow the geothermal formation time to reheat to a higher temperature.

Figure 10:
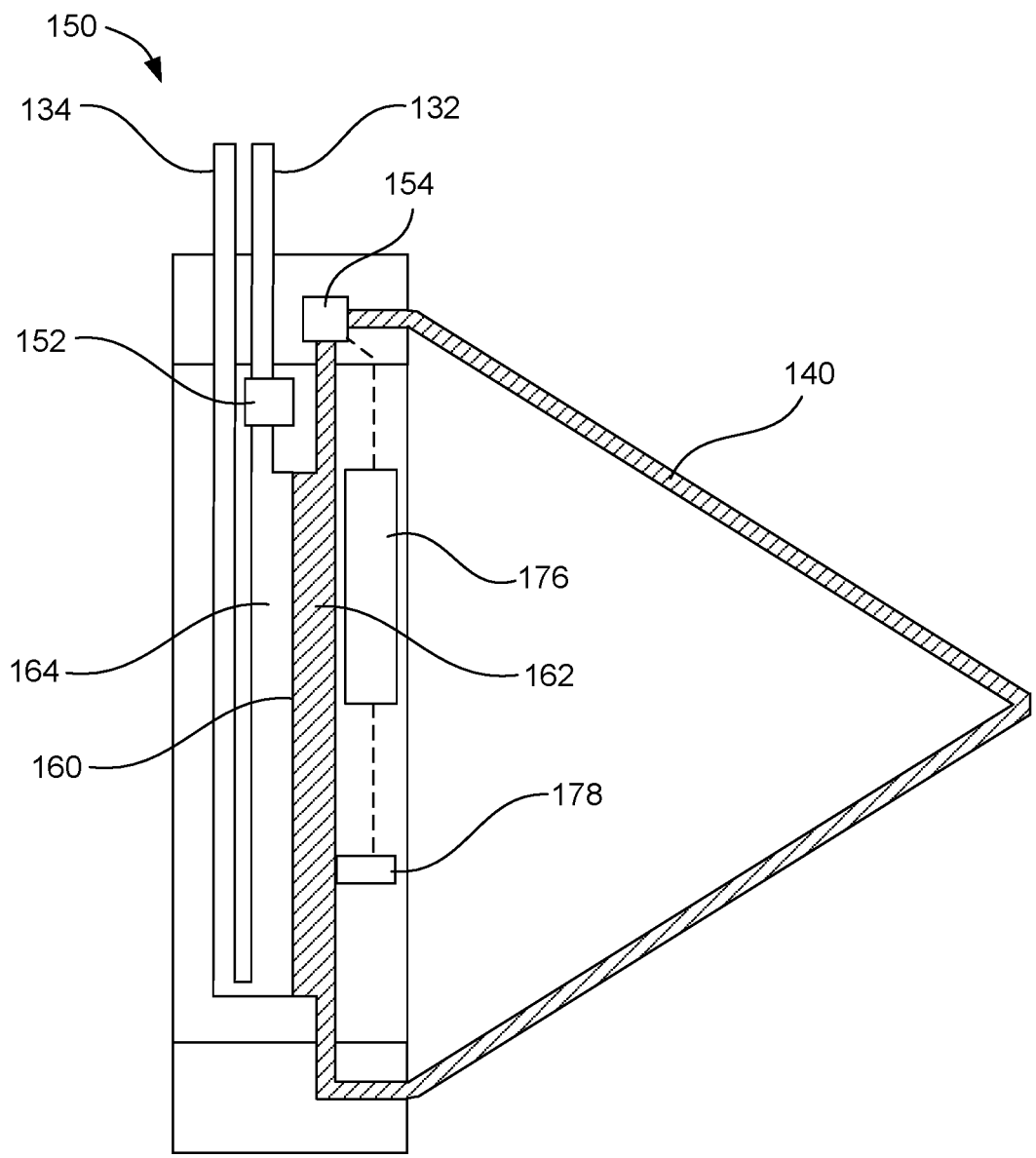
FIG. 10 is a side cross-sectional view of another example downhole heat mining device in accordance with an embodiment of the present invention.

FIG. 10 shows an example downhole heat mining device 150 that includes an integrated processor 176. The processor is connected to a temperature sensor 178 to receive temperature measurement signals from the temperature sensor. The processor is also connected to a pump 154 to allow the processor to control the pump. In this example, the temperature sensor can measure the temperature of the fluid in the secondary fluid loop 140. The processor can control the pump based on the temperature measurements. Temperature sensors can be made of high temperature bi-metal thermocouples, with wiring locally insulated and/or chilled to minimize signal degradation at high temperature, or employ other methods. Electronics for transmitting and processing all signals can be performed either in computers in chambers in the device that are cooled by multiple methods down to safe operating temperatures for electronics (at present <200 C). For example, Peltier devices can be used to actively cool electronics in order to prevent damage to such electronics and maintain proper operation.

The examples described above include secondary fluid loops that are isolated from the primary fluid loop. Heat can be transferred from the secondary fluid loops to the primary fluid loop, but the fluid in the secondary loops does not physically flow into or mix with the fluid in the primary loop. Similarly, the fluid in the primary loop does not physically flow into the secondary loops. In some examples, there can be exceptions to this approach when fluid may be transferred between the primary and second loops. For example, after drilling lateral secondary boreholes to form a secondary fluid loop, the secondary fluid loop may be initially filled with fluid supplied by the primary fluid loop. However, once the secondary loop is filled with fluid and during normal operation of the system, heat transfer can be accomplished primarily through the heat exchanger while the primary fluid loop and secondary fluid loops are isolated one from another. In further examples, fluid can leak out of the secondary fluid loops over time, through natural fractures in the geothermal rock or through imperfect seals in the boreholes or heat mining device. Therefore, in some examples, the fluid in the secondary fluid loops can be replenished using fluid from the primary fluid loop.

In other examples, geothermal heat mining systems can utilize secondary fluid loops that are fluidly connected to the primary fluid loop so that fluid can flow from the primary fluid loop to the secondary fluid loops and back to the primary fluid loop. In such examples, the heat transfer from the secondary fluid loops to the primary fluid loop can be accomplished primarily through mass transfer of fluid physically flowing from the secondary fluid loops to the primary fluid loop. In some examples, the secondary fluid loops can include secondary boreholes, tertiary boreholes, microfracture networks, or a combination thereof, as previously described with respect to an integrated heat exchanger. Thus, the secondary fluid loops can be similar to any of the examples described above. However, in further examples, the secondary fluid loops can be connected directly to the primary fluid loop to allow fluid to flow from the secondary fluid loops into the primary fluid loop. In certain examples, the secondary fluid loops can be connected to the primary fluid loop using valves that can selectively start, stop, and adjust rates of flow through the secondary fluid loops.

The downhole heat mining device can include tools used to form the secondary fluid loops. As in the examples described above, the downhole heat mining device can include lateral drilling heads, tertiary drilling heads, microdamage heads, and so on. In further examples, the downhole heat mining device can also include a valve installation unit. After the heat mining device drills a secondary borehole, the valve installation unit can install a valve that connects the secondary borehole to the primary fluid loop. In particular, the valve can connect the secondary borehole to either the cold working fluid line or the hot working fluid line of the primary fluid loop. In certain examples, the heat mining device can form a secondary fluid loop made up of one or multiple secondary boreholes. The valve installation unit can then install a first valve connecting one end of the secondary fluid loop to the cold working fluid line. The valve installation unit can also install a second valve connecting the other end of the secondary fluid loop to the hot working fluid line. In various examples, the valves can be on/off valves, controllable analog valves, or simple junctions such as a T-junction (i.e., an always-on valve).

In certain examples, the valve installation unit can include an additive manufacturing device, such as a 3D printer. The 3D printer can manufacture valves connecting the cold working fluid line and the hot working fluid line to the secondary fluid loops. In some examples, the 3D printer can continuously manufacture the cold working fluid line and the hot working fluid line as the heat mining device moves down the borehole. Such a 3D printer can also build other parts directly in place as the drilling process continues. For example, although a bore lining is not necessary, in some cases, a bore lining could be printed along exposed surfaces of the borehole as the device descends. The 3D printer can be adapted to form parts from a build material that can withstand the high temperatures in the primary borehole. In some examples, the build material can include high temperature polymers, ceramics, metals, carbon fiber, and so on. This unit can also function to repair parts. Alternatively, remotely controlled units can transport parts, repair damaged components, patch leaks, and the like.

In one example, the interior of the valve installation unit can be cooled by a coiled loop in contact with the inner surface of the outer shell of the device, as described in FIG. 3, such that the electronic elements in the tools described here can operate. Secondary cooling methods can be used, such as by circulating cold fluid through a device built into a housing for the electronics, or running current through thermoelectric (Peltier) devices built into a similar housing around the operating electronics.

In other examples, the valve installation unit can be adapted to receive parts that can be lowered down the borehole from the surface. For example, a valve can be lowered down the borehole, and the valve installation unit can receive the valve and then connect the valve to the cold working fluid line or the hot working fluid line. In this case, fluid circulation can be stopped below the last and deepest secondary loop in order to allow connection of a subsequent lower section. In some options flow can be completely stopped, while optionally a set of multiple valves or a three-way valve can be used to allow temporary diversion of the fluids while connections are being added.

Figure 11:
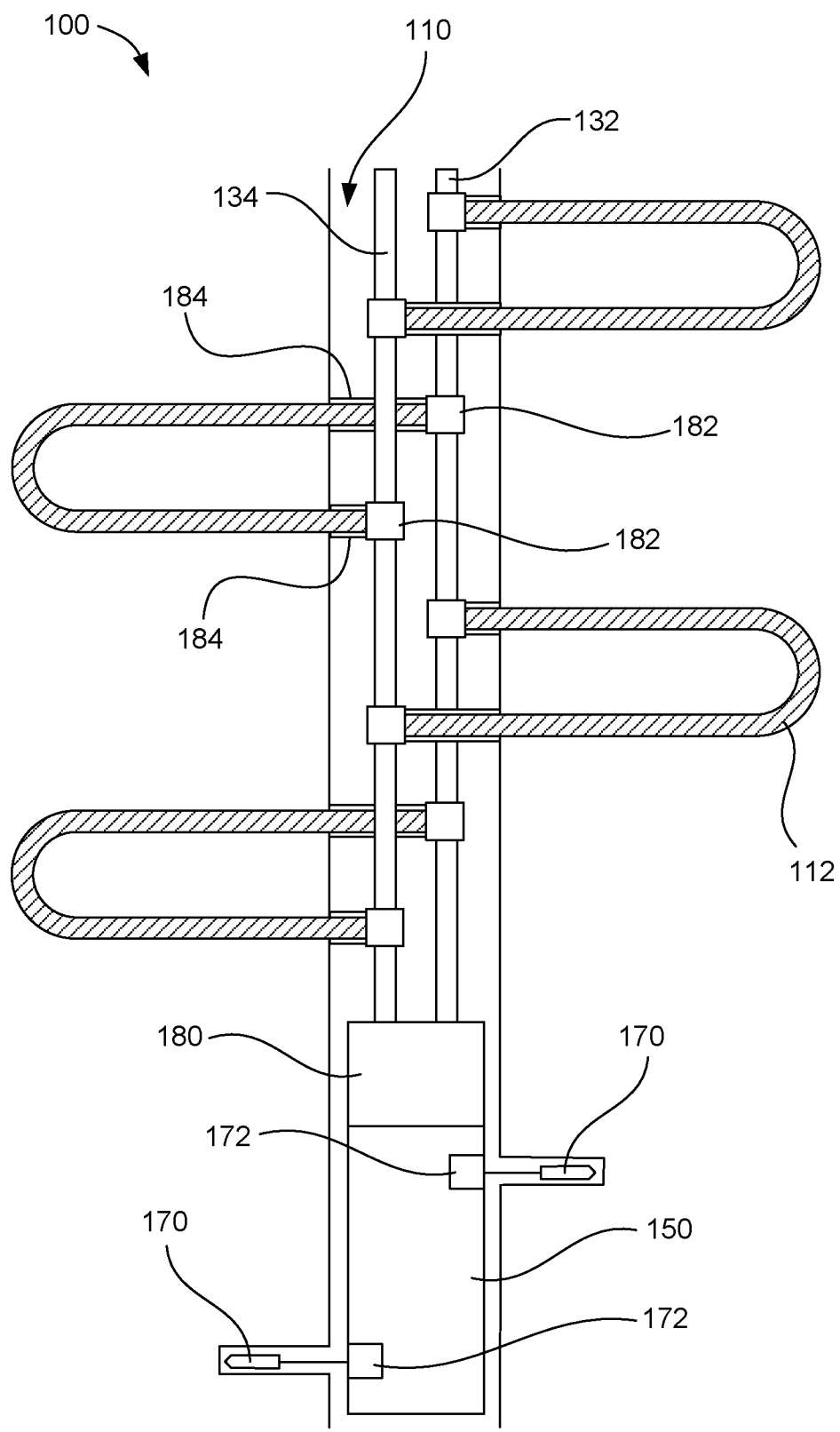
FIG. 11 is a schematic illustration of another example geothermal heat mining system including vertically spaced secondary loops which are directly fluidly coupled to the primary fluid loop in accordance with an embodiment of the present invention.

FIG. 11 shows another example geothermal heat mining system 100 where secondary fluid loops are fluidly connected to the primary fluid loop. This system includes a primary borehole 110, and in the borehole is a downhole heat mining device 150 that has two lateral drilling heads 170. The lateral drilling heads are deployed from lateral drilling units 172 to drill lateral secondary boreholes. The lateral drilling heads in this example can be steerable so they can drill loop-shaped secondary boreholes 112. The downhole heat mining device also includes a valve installation unit 180. The valve installation unit is adapted to install valves 182 connecting the loop-shaped secondary boreholes to the cold working fluid line 132 and the hot working fluid line 134. The valves can be controllable so that the fluid flow through each loop-shaped secondary borehole can be adjusted. The valve installation unit can also install pipe sections 184 that connect the valves to the secondary boreholes at the side surfaces of the primary borehole. In this example, working fluid can flow down the cold working fluid line, and then some of the cold working fluid can be routed through the secondary boreholes. The working fluid can heat up because of contact with the geothermal formation in the secondary boreholes. The heated working fluid can then flow back into the hot working fluid line, and be carried by the hot working fluid line back to the surface. Any number of secondary boreholes can be formed and connected to the primary fluid loop as shown in the previous example. In some cases, using a greater number of secondary boreholes can allow for greater heat production because a greater surface area of the geothermal formation is used to heat the working fluid. In further examples, valves leading the secondary boreholes can be adjusted depending on the demand for thermal energy. Therefore, the system can be flexible to allow the energy production to match demand. The valves can also be adjusted to minimize over-cooling around any of the secondary boreholes. If the geothermal formation reaches a temperature that is too low near a secondary borehole, then the valve leading to that borehole can be shut off temporarily to allow time for the adjacent geothermal formation to re-heat. Notably, the use of transport through insulated pipes means that fluids do not come into direct contact with the primary borehole across most of the length of their flow, thus avoiding any thermal shock that can cause chemical/mechanical degradation of the borehole walls when changing fluid flow rates and temperatures. This design can reduce or eliminate the need for borehole lining systems.

Furthermore, the level of control of fluid mass flux through all parts of the system permits the fluid pressure to be highly controlled. This level of control can enable the system to maintain fluids at supercritical conditions throughout, when fluid pressure and temperature conditions permit this state to be stable. Enabling supercritical fluids to reach the surface can allow a much higher efficiency of power generation, by employing, for example, a "triple expansion" system. The previous example shows multiple secondary boreholes that are formed as loop-shaped boreholes by using a steerable lateral drilling head. However, other forms of secondary fluid loops can also be formed and connected to the primary fluid loop using valves. Any of the example arrangements of secondary fluid loops shown above can be used, including loops formed by drilling two secondary boreholes that meet one another, or loops formed by drilling secondary boreholes into existing microfracture networks, or loops formed by creating new microfracture networks.

Figure 12:
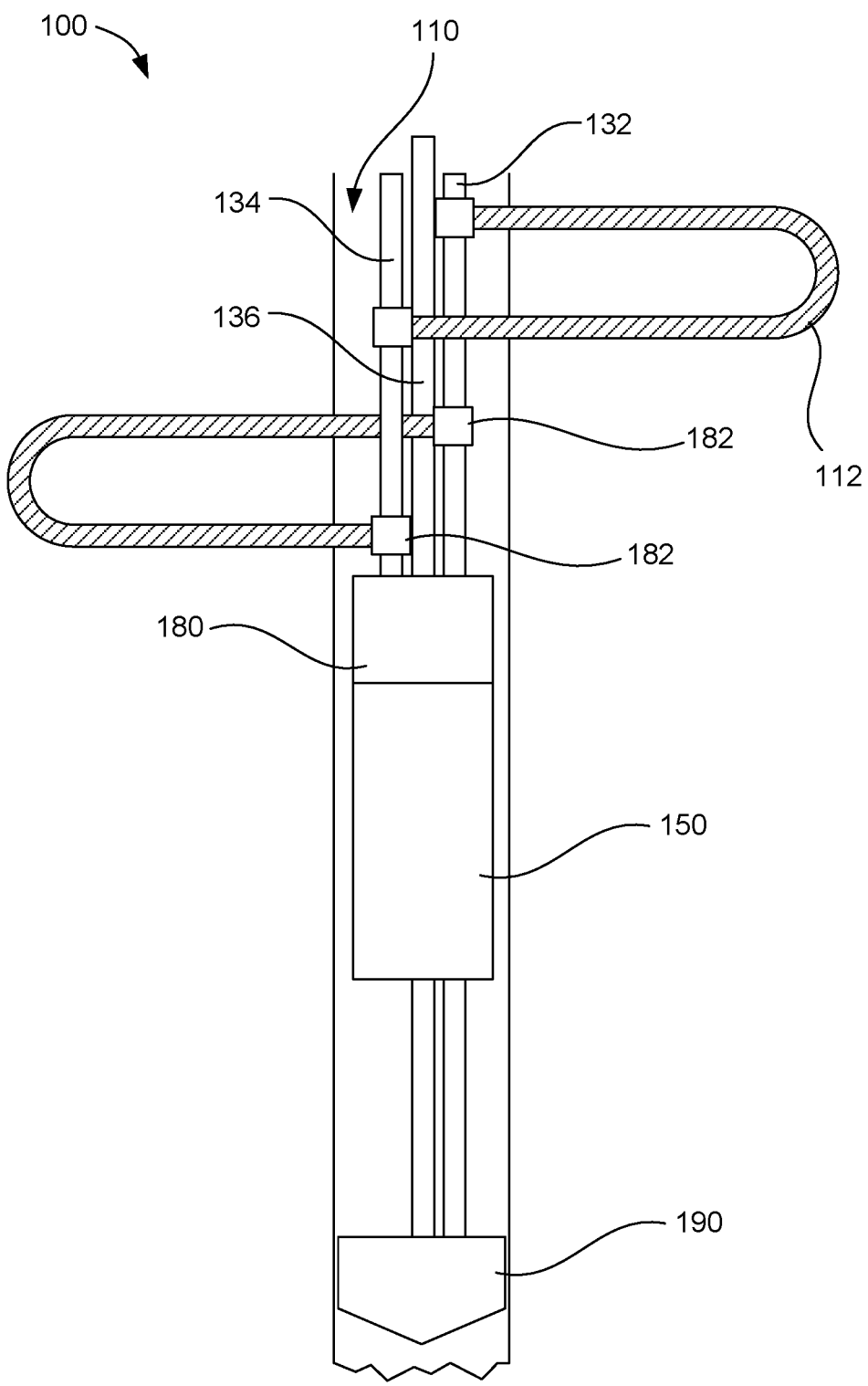
FIG. 12 is a schematic illustration of another example geothermal heat mining system which allows for simultaneous heat recovery and main borehole drilling in accordance with an embodiment of the present invention.

The downhole heat mining device can also be adapted to increase the depth of the primary borehole. In some examples, the downhole heat mining device can increase the depth of the primary borehole while simultaneously producing heat energy from the geothermal reservoir. FIG. 12 shows an example geothermal heat mining system 100 that includes a downhole heat mining device 150 having a drill head 190 for drilling the primary borehole. The drill head is positioned at a downhole end of the heat mining device. In this example, the drill head can be extended downward from the heat mining device so that the depth of the primary borehole can be extended while the heat mining device can simultaneously perform other actions such as installing valves between the primary fluid loop and secondary fluid loops 140. The heat mining device can be locked in place while drilling continues. For example, spikes, cables, and/or wheels can be used to maintain a main body of the heat mining device in place (whether it includes a heat exchanger or not) while the primary drill head 190 continues operation. The primary fluid loop includes a cold working fluid line 132 and a hot working fluid line 134. In this example, a slurry line 136 is also included which is fluidly separate from the primary loop fluids. The drill head in this example is a cold spallation drill head, which can use cold water to microfracture the hot rock of the geothermal reservoir. The cold working fluid line and the slurry line extend to the drill head. As the drill head removes small, broken pieces of rock using the cold working fluid, the slurry made up of the rock and working fluid can be extracted through the slurry line and sent back up to the surface. Further, both primary and secondary drill heads can be fluidly connected to the slurry line.

Any suitable type of drill head can be used to form the primary borehole. In some examples, the drill head can include a rotary mechanical drill head, a percussive drill head, a hot spallation drill head such as a hydrothermal spallation drill head, a cold spallation drill head, or a combination thereof. When the heat mining device is in a geothermal reservoir at a high temperature, such as 500° C. or more, within the so-called brittle ductile transition regime, whose temperature depends on the rock composition, a cold spallation drill head can be particularly useful. The cold spallation drill head can include a jet for jetting cold fluid, such as water, onto the geothermal rock. Jetting cold water onto the hot rock can cause a thin layer of the rock to cool and contract very quickly, which can create small-scale fractures in the rock. In some cases, the fractures can cause particles of rock to break off. In certain examples, the cold fluid can be pressurized to a high pressure, which can cause the fluid to expand in the fractures and help remove the fracture particles. These particles can be removed from the borehole via a slurry line in some examples. In further examples, a combination of cold fluid jets and mechanical force can be used. For example, cold fluid can be jetted on the rock to form fractures and then the drill head can use rotary motion or percussive force to break the fractured rock. The cold jet can also be pulsed, with sufficient time between pulses or groups of pulses to allow the geothermal rock to re-heat between pulses or between groups of pulses. Allowing the rock to re-heat can promote fracture formation by ensuring a large temperature difference between the rock and the cold fluid jets. The fluid can also be pulsed with increasingly higher pressures. In other examples, hot hydrothermal spallation can be used. For example, pressurized fluid at a higher temperature than the rock can be used. For example, initial shallow regions of rock may be at relatively low temperatures in which case a hot hydrothermal spallation drilling can be useful until temperatures increase sufficiently to make cold spallation drilling more efficient. The pressurized fluid can expand fractures, spalling off small rock fragments, and removing that fractured material as a slurry to expose a new rock surface.

Cold spallation drill heads can also be configured to be steerable. In some examples, the cold spallation drill head can include a number of fluid jets oriented in different directions at angles with respect to a boreline axis. To steer the drill head, the fluid jets pointing the desired direction can be used to preferentially remove rock in that particular direction. This can change the direction of the borehole and steer the drill head. Such steerable drill heads can be used for the main drill head that drills the primary borehole, and for the secondary and tertiary drill heads that are used to drill secondary and tertiary boreholes. In further examples, the secondary and tertiary drill heads can be any other suitable type of drill head, such as rotary drill heads, percussive drill heads, hot spallation drill heads, and others.

In order to more accurately steer primary drilling direction, secondary drilling directions, tertiary drilling directions, or each of these drilling directions, position sensors can provide feedback to the processor in order to adjust direction of drilling to obtain a desired main boreline shape and direction, secondary line shape, and/or tertiary line shape.

For example, inductive sensors, magnetic sensors, echo location, distributed acoustic sensing (DAS), beamforming a seismic noise source (e.g. acoustic emissions from a drilling head, electromagnetic energy from an electric motor, etc), or the like can be used in methods to locate a drill head position relative to a main boreline and/or relative to a corresponding drill head base unit. In some cases a set a three position sensors spaced apart from one another can precisely determine a relative position of the drill head.

In further examples, the downhole heat mining device can be self-assembling or semi-self-assembling. This capability can allow a relatively small diameter initial borehole to be drilled first. After reaching a desired depth, such as a depth where the temperature of the rock is about 500° C., the bottom of the initial borehole can be widened by various methods. In some examples, the downhole heat mining device lowered down the initial narrower borehole can include a drill head that excavates a zone nominally wider than the initial borehole, and then self-expand using material brought down on a component transport elevator, and/or a cylindrical shell that is layered and expandable, along with a drill head that can widen progressively. The drill head can then be used to increase the depth of the borehole at the wider borehole width. The cold working fluid line, hot working fluid line, slurry, line and any lines or tubes, such as for power or control signals, and component transport elevator can be thin enough to pass through the narrower initial borehole section. As the borehole drilling unit progresses with drilling the larger diameter cavity, the downhole heat mining device can self-assemble operable units at the diameter of the widened borehole. This self-assembly would occur by robotic addition of components that are lowered down the component elevator.

In further examples, the geothermal heat mining systems can include a combination of the features of examples that include secondary fluid loops that are fluidly connected to the primary fluid loop, and examples that include a heat exchanger to transfer heat between secondary fluid loops that are fluidly isolated from the primary fluid loop. In one example, a downhole heat mining device can include an internal heat exchanger with the cold working fluid line connected to the cold side of the heat exchanger, as in several of the examples described above. However, the downhole heat mining device can also include a valve installation unit. The system can include multiple secondary loops that connect directly to the cold working fluid and hot working fluid through valves installed by the valve installation unit. At the same time, the downhole heat mining device can use the internal heat exchanger to transfer additional heat to the working fluid. The heat can be transferred from a secondary fluid loop contained within the downhole heat mining device, such as a fluid loop that collects heat from the exterior shell of the downhole heat mining device. Alternatively, or additionally, the heat can be transferred from another secondary loop formed by drilling secondary boreholes into the geothermal reservoir. Thus, a single system can include a combination of the features described above.

Figure 13:
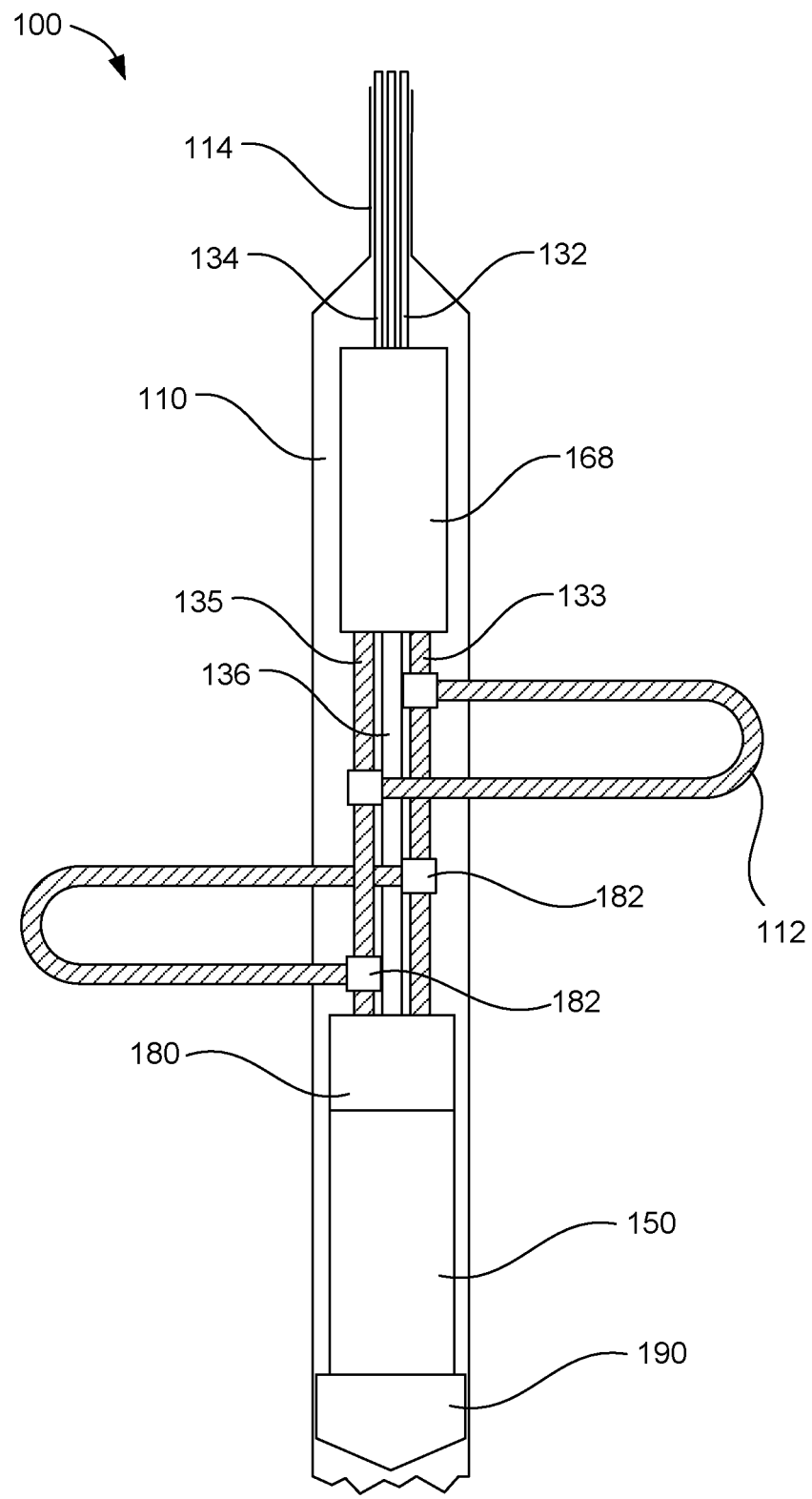
FIG. 13 is a schematic illustration of another example geothermal heat mining system in accordance with an embodiment of the present invention.

In another example, a heat exchanger can be included in the primary borehole, but separate from the downhole heat mining device. FIG. 13 shows one such example geothermal heat mining system 100. This system includes a narrow initial borehole 114 which is widened to transition to a wider primary borehole 110. After the borehole is widened, the downhole heat mining device 150 can self-assemble in the wider section. The downhole heat mining device includes a drill head 190 that can be used to increase the depth of the primary borehole. The downhole heat mining device can also assemble an independent heat exchanger 168 in the primary borehole which is separate from the drill head 190 and valve installation unit 180. The cold working fluid line 132 and the hot working fluid line 134 can be connected to a cold side of this heat exchanger. The hot side of the heat exchanger can be connected to the additional fluid lines 133, 135 that extend below the heat exchanger. These additional fluid lines are further connected using valves to lateral loop-shaped secondary boreholes 112. These secondary boreholes can be used to cycle fluid to pick of heat from the geothermal reservoir, as described above. However, in this example, the entire group of the secondary boreholes and the additional fluid lines below the heat exchanger can be considered to be a secondary fluid loop, and the cold working fluid line and hot working fluid line leading to the heat exchanger can be considered to be the primary fluid loop. The fluid lines making up the secondary fluid loop are shaded with diagonal hatching lines in this figure. In this example, the primary working fluid loop and the secondary fluid loop are fluidly isolated one from another. Again, this can mean that the loops are fluidly isolated during normal operation for transferring heat through the heat exchanger, but there may be exceptions such as when working fluid is need to initially fill a new secondary boreholes or to replenish fluid that has leaked out of the secondary fluid loop.

Geothermal Heat Mining Methods

In addition to the geothermal heat mining systems and devices described above, the present disclosure also describes corollary geothermal heat mining methods. The methods can include forming geothermal heat mining systems as described above and using the systems to produce geothermal energy using the systems. In more detail, the methods can include controlling fluid flow through the primary fluid loop, the secondary fluid loop, or both to thereby control the rate of heat production from the systems.

Figure 14:
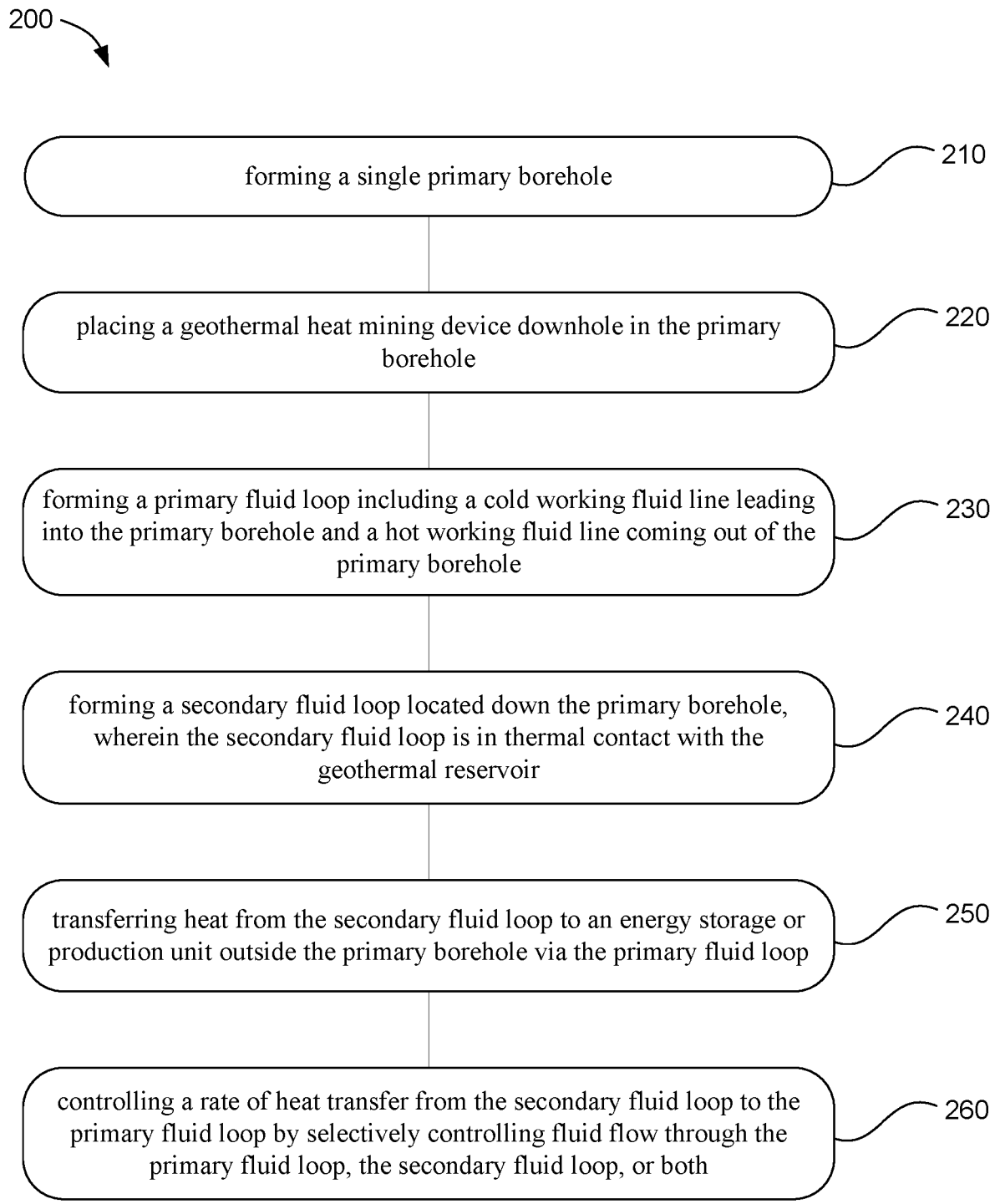
FIG. 14 is a flowchart illustrating an example geothermal heat mining method in accordance with an embodiment of the present invention.

FIG. 14 is a flowchart showing one example geothermal heat mining method 200. The method includes: forming a single primary borehole 210; placing a geothermal heat mining device downhole in the primary borehole 220; forming a primary fluid loop including a cold working fluid line leading into the primary borehole and a hot working fluid line coming out of the primary borehole 230; forming a secondary fluid loop located down the primary borehole, wherein the secondary fluid loop is in thermal contact with the geothermal reservoir 240; transferring heat from the secondary fluid loop to an energy storage or production unit outside the primary borehole via the primary fluid loop 250; and controlling a rate of heat transfer from the secondary fluid loop to the primary fluid loop by selectively controlling fluid flow through the primary fluid loop, the secondary fluid loop, or both 260.

In some examples, working fluid can be pumped into the primary borehole from the surface. Working fluid can include, for example, water, liquid $CO_2$, or other high heat-capacity coolants. The working fluid can optionally include additives used to adjust properties of the fluid. Non-limiting examples of additives can include surfactants, anti-flocculants, pH adjusters, colorants, viscosity adjusters, and the like. In certain examples, working fluid can be pumped down the borehole through the cold working fluid line. The working fluid can be heated by transferring heat from the secondary fluid loop downhole, and then heated working fluid can be produced out of the borehole through the hot working fluid line. The working fluid can be at a relatively lower temperature in the cold working fluid line compared to the hot working fluid line. In various examples, the working fluid in the cold working fluid line can have a temperature from about 0° C. to about 200° C. when the working fluid enters the primary borehole. The working in the hot working fluid line can have a higher temperature, which can be from about 150° C. to about 500° C., in some examples. In one example, the working fluid can be heated to a supercritical aqueous fluid, at about >400° C. and 25 MPa. In some examples, the cold working fluid line and the hot working fluid line can form a closed loop, and if so, can be a different composition than the working fluid in the secondary loop. An energy production or storage unit can be located on the surface, and the thermal energy in the hot working fluid line can be transferred or used in the energy production or storage unit. For example, the working fluid in the hot working fluid line can be steam or supercritical fluid, and the energy production unit can be a steam turbine generator. The steam can power the steam turbine generator and then be condensed to liquid water, which can flow down the cold working fluid line.

In further examples, working fluid from the cold working fluid line can also be used by a cold spallation drill head. For example, a bleed line can be connected to the cold working line via a valve to divert a portion of the cold working fluid to the drill head. The drill head can jet the cold working fluid onto the rock to form fractures, as described above. In some examples, the cold spallation drill head can also include a chiller that can further reduce the temperature of the cold working fluid. For example, a thermoelectric device, also called a Peltier device, could be used to chill fluids just before they enter a pump at the drill head. Decreasing the temperature of the fluid that is jetted from the cold spallation drill head can increase the thermal shock stresses and thus the effectiveness of the fluid for fracturing the hot rock. In certain examples, the fluid jetted by the cold spallation drill head can include water and the temperature can be from about −10° C. to about 50° C., or from about 0° C. to about 20° C.

The primary borehole can be drilled to any desired depth underground where the temperature is in a suitable range for extracting geothermal energy. In some examples, the primary borehole can be drilled to a depth where the target temperature is from about 300° C. to about 600° C., and often from 450° C. to 500° C. The depth of the primary borehole can within very shallow subsurface of less than 1-4 km in regions with shallow magmatic intrusions (or if the user seeks low temperature reservoirs). This invention can make high temperature geothermal resources reliably accessible, so one desirable target is about 500° C. For example, in colder regions with a geothermal gradient of about 25° C./km, 500° C. is reached at about 20 km. For regions with a high gradient (about 75° C./km), this target is reached at 6-7 km.

The primary borehole can have a sufficient diameter to accommodate the downhole heat mining device, in particular the simpler examples. In some examples, the primary borehole can have a diameter from about 20 to about 40 cm, and fit the heat mining device of a smaller diameter. In certain examples, a narrower initial borehole can be drilled and then widened. The initial borehole can be drilled to a depth at which the target temperature is reached, described above, at a minimum diameter of about 20 cm, and then widened to a sufficient width to accommodate the downhole heat mining device, which may use a diameter of about 50-100 cm or possibly more, depending on the coherence of the surrounding rock and corresponding mechanical support. The wider borehole can then be extended downwards further by about 100 to 1000 m or more, depending on the number of lateral loops that system can accommodate. Lateral secondary boreholes may have diameters of about 2-10 cm, and have much greater lengths, from about 10-1000 m or more.

The downhole heat mining device can have a variety of arrangements and shapes. In some examples, the downhole heat mining device can have a housing that is cylindrically shaped, or has an overall cylindrical shape. The housing can be made from materials that can withstand high temperatures and pressures, such as 600° C. and 500 Mpa (though the material would not likely need to withstand the rock pressure). Non-limiting examples of such housing materials can include nickel-chromium alloys (e.g. INCONEL, HASTELLOY types), martensitic metal alloys, high carbon steels, various ceramics, and the like.

The systems and methods described herein can be particularly useful because the systems and methods can allow geothermal energy to be accessed with a single primary borehole. Additionally, geothermal energy production can begin while the downhole heat mining device is still in process of deepening the primary borehole and/or forming additional secondary boreholes and assembling fluid lines to transfer more heat energy to the surface. In comparison, many other geothermal production systems utilize two boreholes to recover heat, with one injection borehole and one production borehole. Geothermal energy is not produced by such systems until both the injection and the production boreholes have been drilled and fluidly connected. There is much uncertainty in the accessible heat when connecting two boreholes by engineered production. Therefore, the downhole systems described herein can allow for one or more boreholes to each produce geothermal energy. These one or more boreholes can each be fluidly isolated from one another. Furthermore, many other geothermal production methods use large-scale hydraulic fracturing to increase the permeability of the geothermal rock and allow working fluid to flow between the injection borehole and the production borehole. This hydraulic fracturing can cause unwanted seismicity as a side effect. The systems and methods described herein can reduce this unwanted seismicity by using fluid loops that either do not include manufactured fractures or which include manufactured fractures in small localized areas. Therefore, these systems and methods can offer great flexibility and predictability for extracting geothermal energy over long durations (decades).

Although the systems and methods described herein can be used with a single primary borehole, in some examples it may be useful to drill multiple primary boreholes as parts of a larger energy production system. When multiple primary boreholes are used, each of the boreholes can include a cold working fluid line leading into the borehole and a hot working fluid line coming out of the borehole. Thus, the boreholes are not used in pairs as injection and production boreholes, as in other processes. In the systems described herein, the multiple primary boreholes can each include a downhole heat mining device and other equipment as described herein, so that the primary boreholes can operate in parallel. This can increase production capacity and flexibility. The energy produced by the individual primary boreholes can be controlled and adjusted to match energy demand, for example. Furthermore, locations of each borehole can be adjusted based on available geothermal reservoir configurations which are often not uniformly distributed within the formation.

Figure 15:
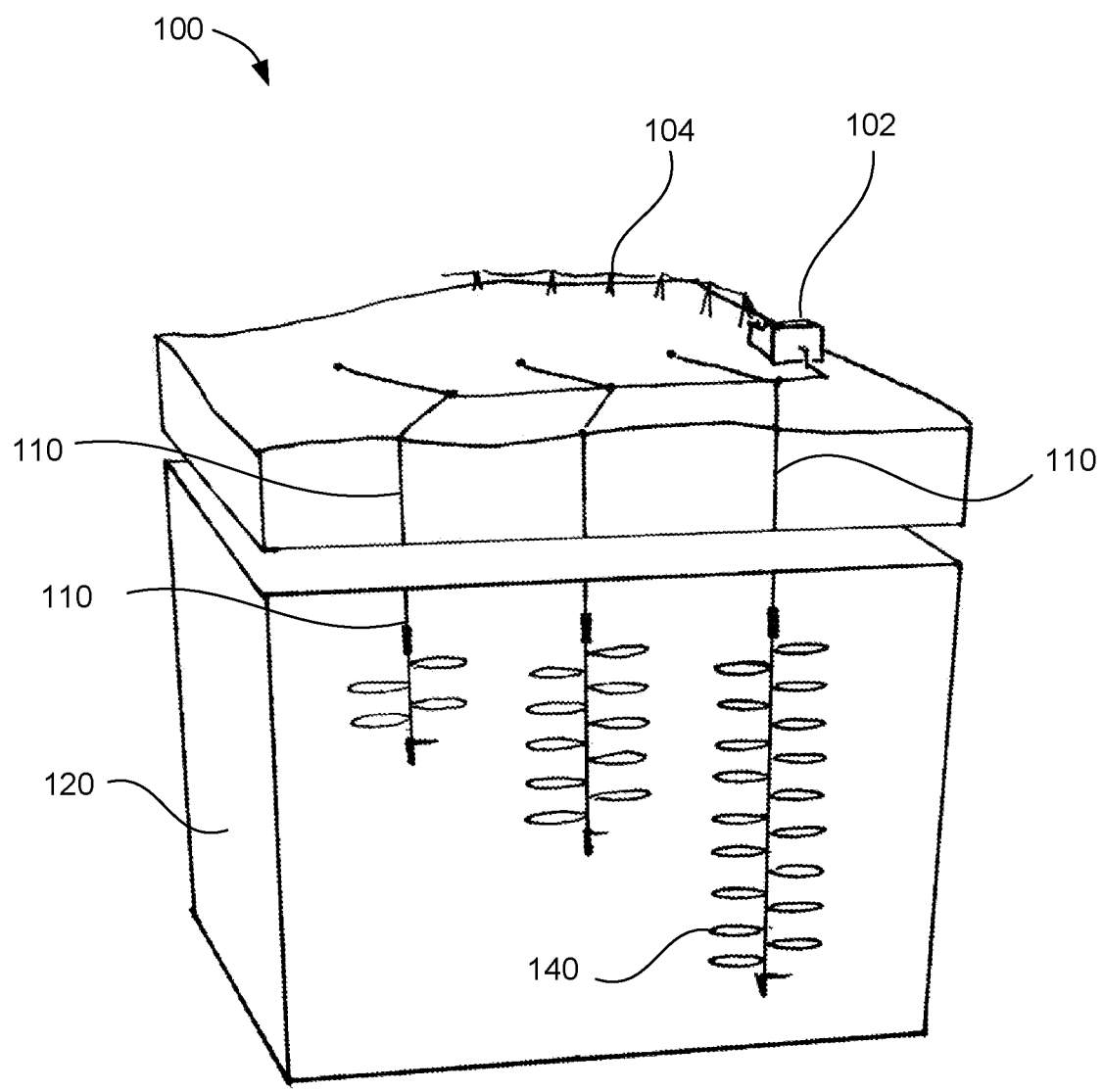
FIG. 15 is a schematic illustration of another example geothermal heat mining system including multiple primary boreholes in accordance with an embodiment of the present invention.

FIG. 15 shows one example geothermal heat mining system 100 that includes multiple primary boreholes 110. The boreholes are drilled into a geothermal reservoir 120 to a depth where the temperature is between about 500° C. and about 600° C. A downhole heat mining device is used in each borehole to form multiple secondary fluid loops 140. Fluid can flow through the secondary fluid loops to collect heat from the geothermal reservoir, and then the heat can be transferred to a hot working fluid line in any of the ways described above. The hot working fluid lines from all of the primary boreholes can lead to a power generation station 102. The power generation station can generate electricity using the heat energy from the hot working fluid. The electricity can be transmitted using power lines 104 to be used in the power grid. Although these illustrations include about 30 secondary loops, any number of secondary loops may be used. As a general guideline, from 2 to 100 secondary loops can be used, and in some cases from about 10 to about 50 secondary loops can be included in a single primary borehole.

Figure 16:
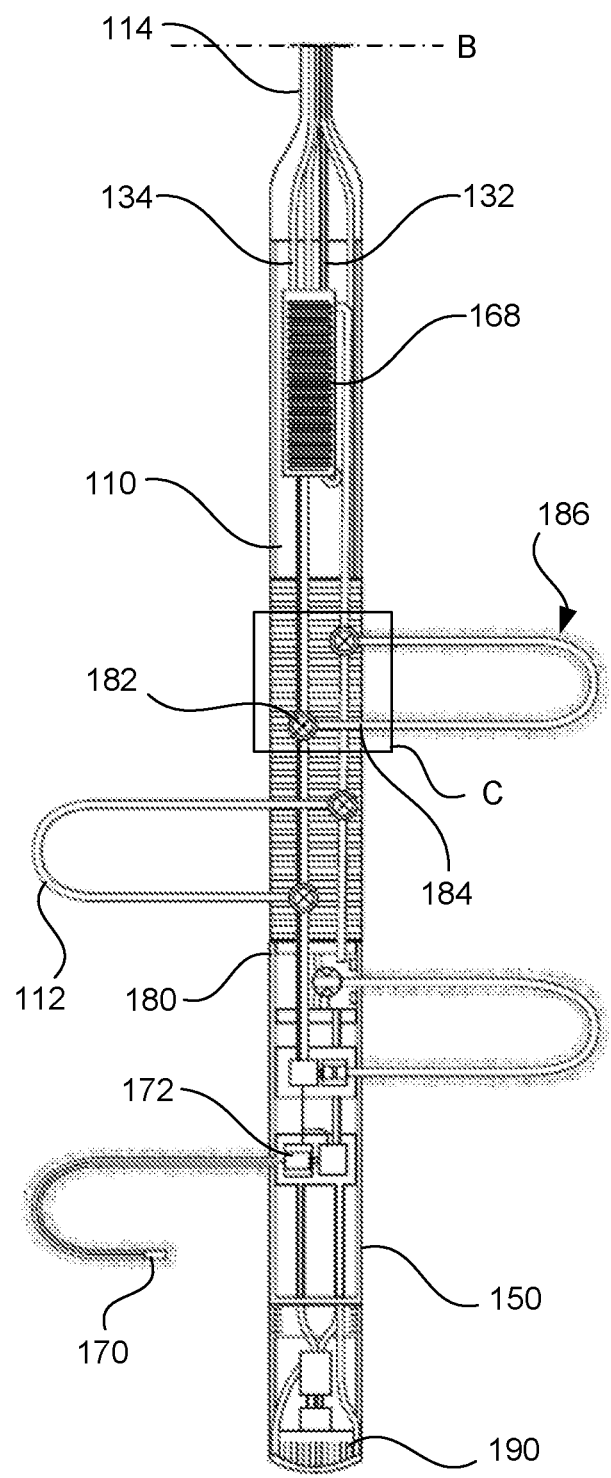
FIG. 16 is a close-up view of a section of a primary borehole containing a heat mining device and secondary boreholes in accordance with an embodiment of the present invention.

FIG. 16 shows a closer view of a section of one of the primary boreholes 110. In this example, an initial narrow borehole 114 is widened to form the full diameter of the primary borehole 110. A heat exchanger 168 is assembled in the borehole, and a cold working fluid line 132 and hot working fluid line 134 are connected to a cold side of the heat exchanger. Additional fluid lines are formed below the heat exchanger, including loop-shaped secondary boreholes 112. In this example, the geothermal formation is also fracture around the secondary boreholes to increase the permeability of the rock. A downhole heat mining device 150 is also assembled in the borehole. The device includes valve installation unit 180 that can install valves 182 and pipe segments 184 to connect the secondary boreholes. The illustration also shows microfractures 186 within the rock formation immediately adjacent the secondary borehole. The device also includes a drilling unit 172 that deploys a secondary drilling head 170 to drill the loop-shaped secondary boreholes. At the downhole end of the device is a primary drilling head 190 that includes cold spallation fluid jets.

Figure 17A:
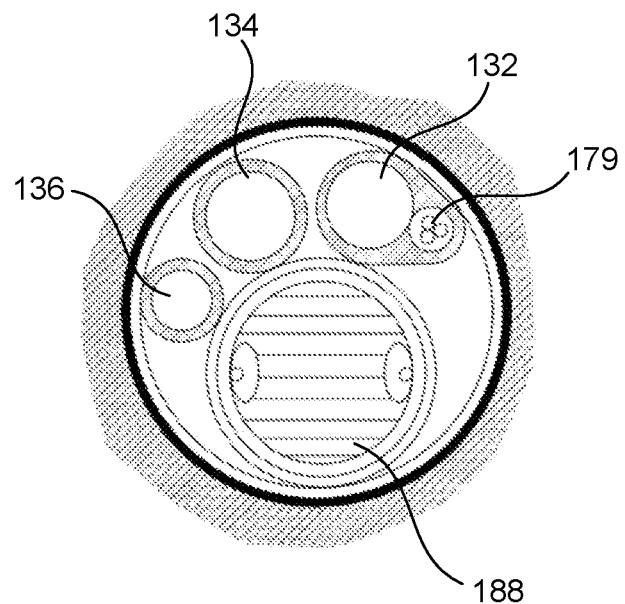
FIG. 17A is a cross-sectional view taken along dashed and dotted line "B" in FIG. 16.
Figure 17B:
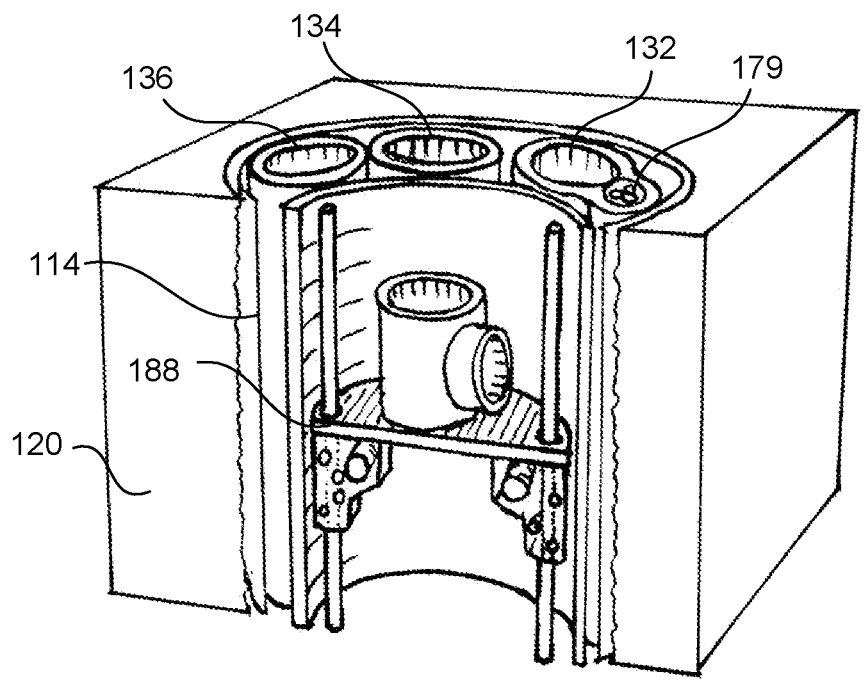
FIG. 17B is a perspective cutaway view of the narrow borehole segment shown in FIG. 17A.

FIG. 17A shows a cross section of the narrow initial borehole as viewed toward the plane depicted as dotted and dashed line "B" in FIG. 16. Several pipes extend down the initial borehole. These include the cold working fluid line 132 and hot working fluid line 134. These pipes can be wrapped with a layer of insulation to prevent unwanted heat transfer. A slurry line 136 is used to remove the slurry of broken rock formed by cold spallation drilling. Data and power cables 179 are routed next to the cold working fluid line. A component transport elevator 188 is also used to provide a way to lower parts and/or materials down the borehole for self-assembly of the downhole heat mining device. A perspective cutaway view of the narrow borehole 114 segment is shown in FIG. 17B. This figure shows how the fluid lines, data cables, and parts transport elevator are arranged in the narrow section of the borehole that extends through the geothermal formation 120.

Figure 18:
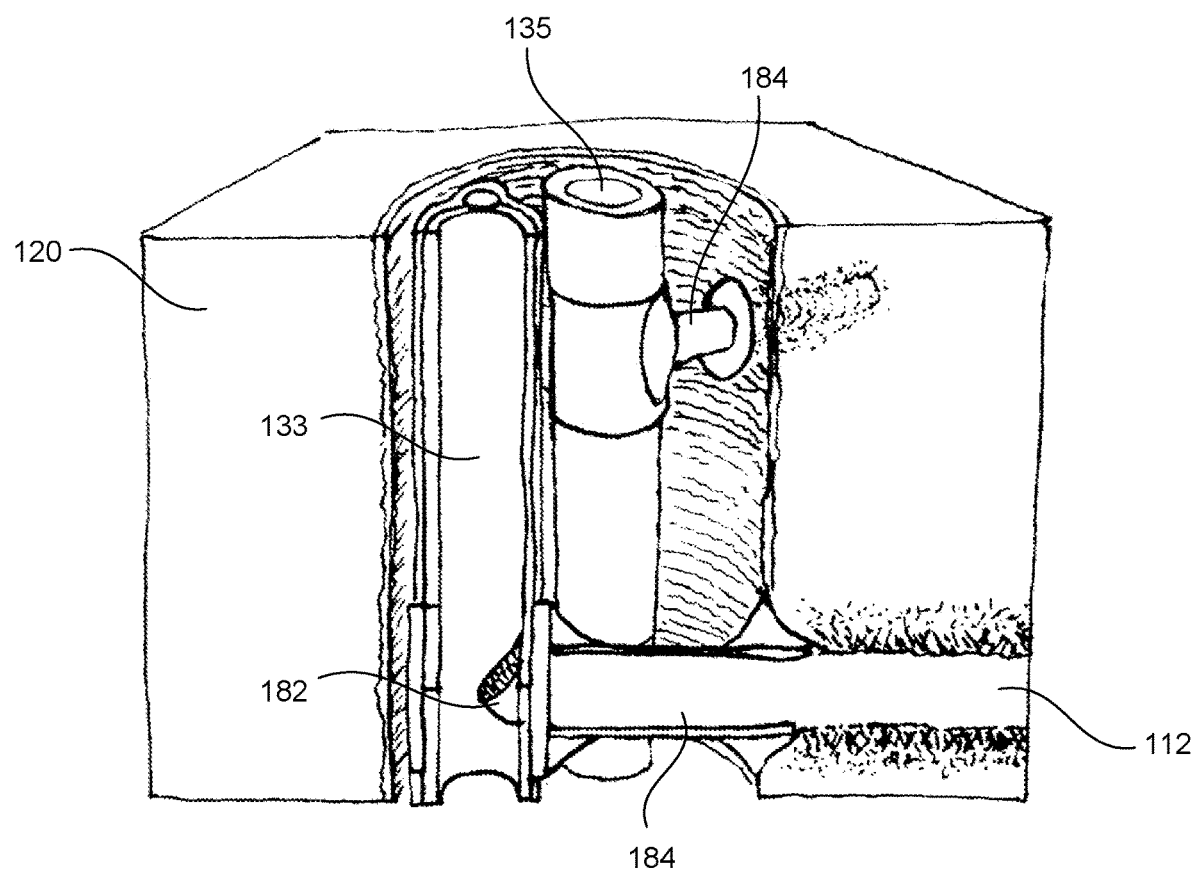
FIG. 18 is a close-up view of box "C" in FIG. 16.

FIG. 18 shows a closer view of the section depicted in box "C" in FIG. 16. A cold fluid line 133 contains fluid flowing down, and a hot fluid line 135 contains fluid flowing up. A portion of the cold fluid is diverted by a valve 182 into a pipe segment 184 that connects to a loop-shaped secondary borehole 112. The secondary borehole passes through the geothermal formation 120 and connects back to the hot fluid line through another pipe segment.

Figure 19:
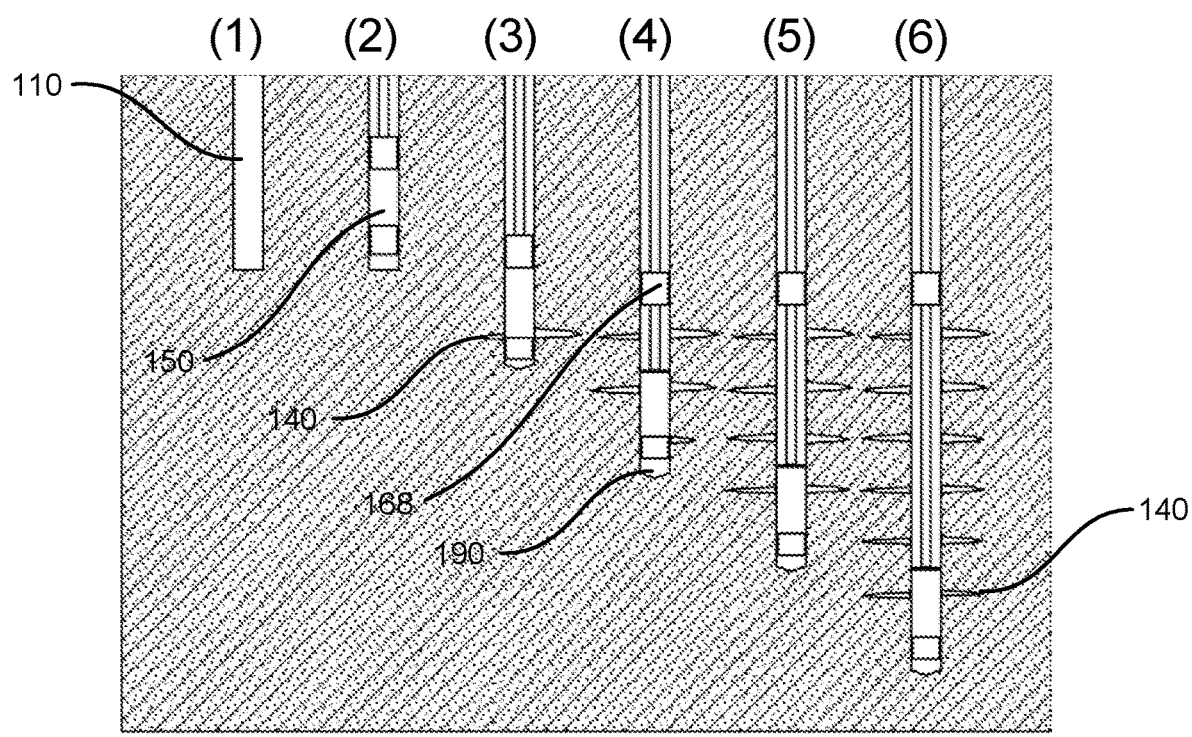
FIG. 19 is a schematic illustration of another example method of drilling a primary borehole and adding secondary boreholes and fluid loops without widening the initial borehole in accordance with an embodiment of the present invention.
Figure 20:
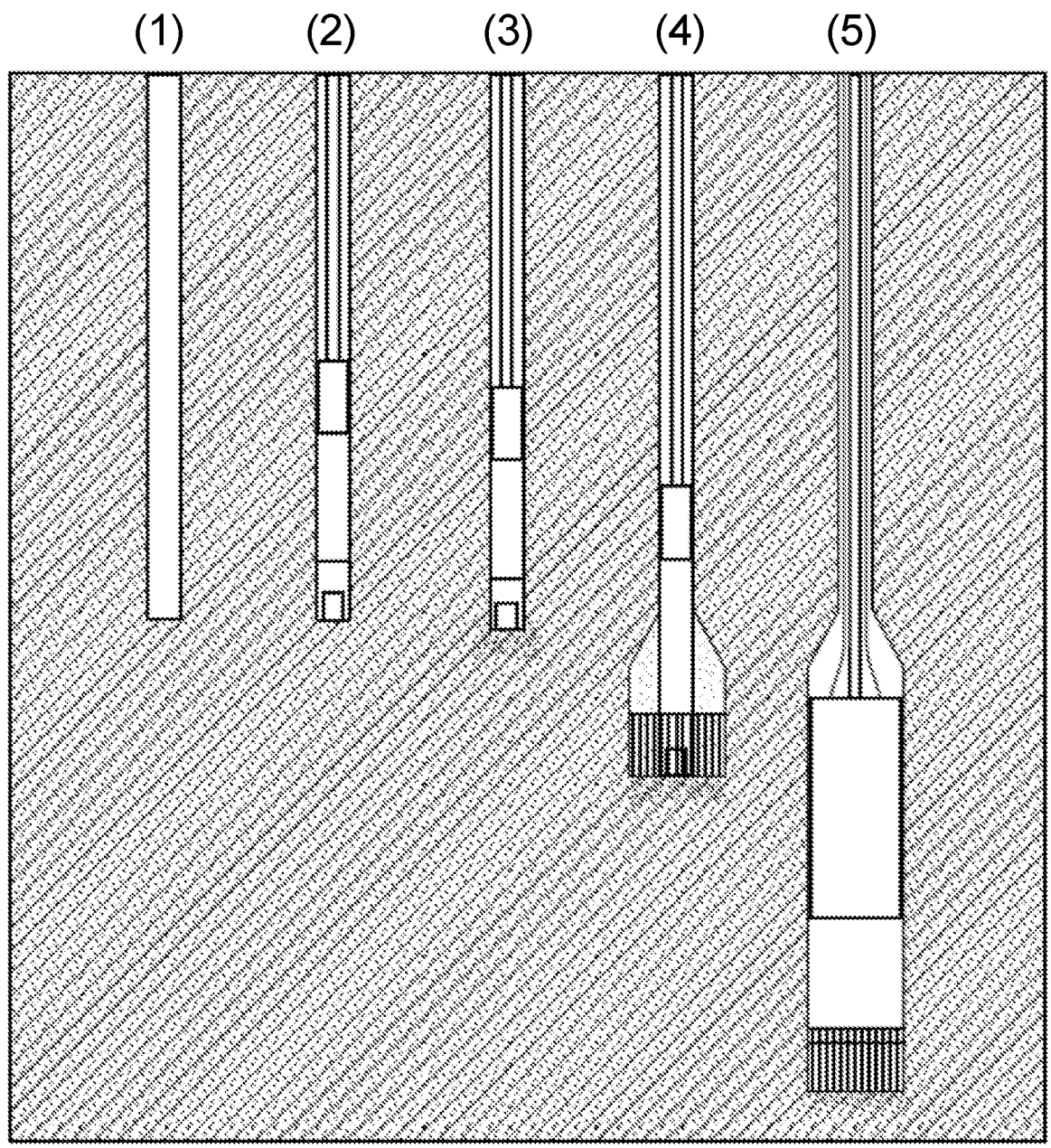
FIG. 20 is a schematic illustration of a method of progressive widening of an initial borehole in accordance with an embodiment of the present invention.

FIG. 19 shows an example method for drilling a primary borehole and producing geothermal energy (without widening the initial borehole). In stage 1, a primary borehole 110 is first drilled to a desired depth using any suitable drilling method. As explained above, the initial depth can be sufficient to reach a target temperature to begin extraction of geothermal energy. In some examples, the initial borehole can be drilled to a depth where the temperature of the surrounding formation is about 500° C. or greater. In stage 2, a downhole heat mining device 150 is lowered down the primary borehole. If the initial drilling method cannot achieve the desired depth, the device can continue drilling. In stage 3, the downhole heat mining device begins to drill lateral secondary boreholes to form secondary fluid loops 140. In stage 4, a heat exchanger section 168 detaches from the downhole heat mining device and is fixed in place, serving as the connection between the primary loop and all the heat mining activity occurring at greater depths. The rest of the device moves deeper by drilling the primary borehole using a primary drill head 190. The downhole heat mining device also continues to drill secondary boreholes to form additional secondary fluid loops, and connects the secondary fluid loops to the cold and hot working fluid lines using valves. In stages 5 and 6, the downhole heat mining device continues to drill deeper while adding secondary fluid loops. The system can simultaneously produce geothermal energy by transferring heat from the secondary fluid loops to the primary fluid loop through the heat exchanger and using the heat to generate energy at the surface. FIG. 20 shows an example method of widening an initial borehole and assembling the downhole heat mining device in the widened borehole. In stage 1, an initial primary starter borehole can be drilled to the desired target temperature, or to the greatest depth that the drilling method is capable of (if not at the target depth). In stage 2, a downhole heat mining device with a primary borehole drilling unit is lowered into the starter borehole. Not included in the figure is the possibility that this unit can continue drilling until the target depth is reached. In stage 3, the drilling unit begins to widen the borehole diameter. In stage 4, the drilling unit has reached the desired diameter and is self-assembling using components lowered down by the component transport elevator, and/or mechanical expansion of units, sections and components, and continues drilling at the new diameter. In stage 5, the downhole heat mining unit begins self-assembly of additional units, that can progress according to the method shown in the following figure.

Figure 21A:
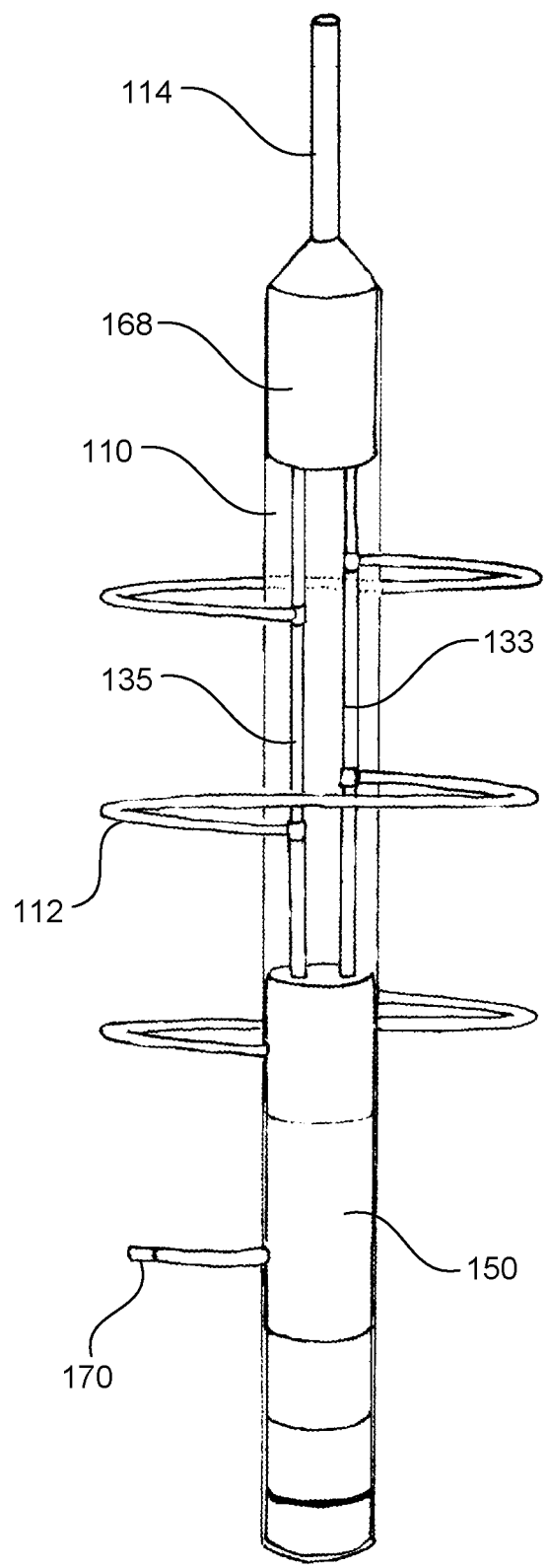
FIG. 21A is a side view of an example second of a borehole and an example downhole heat mining device within the borehole in accordance with an embodiment of the present invention.
Figure 21B:
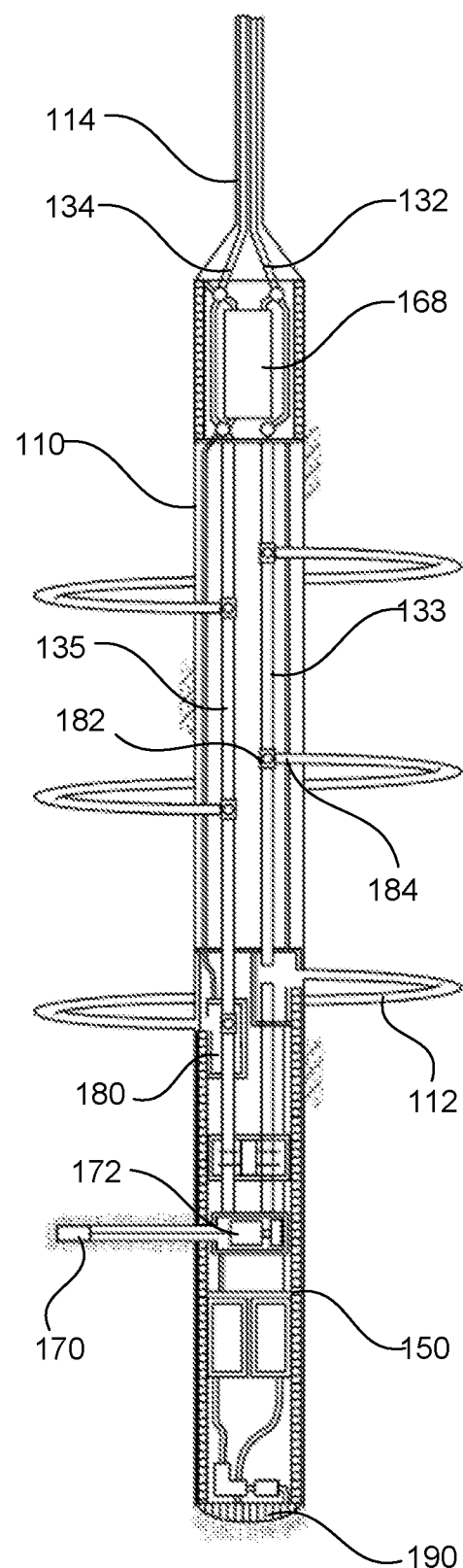
FIG. 21B is a cross-sectional view of the example shown in FIG. 21A.

FIG. 21A is a side view of another example showing a section of an initial narrow borehole 114 that is widened to a wider primary borehole 110 with a downhole heat mining device 150 in the primary borehole. This example is similar to the example shown in FIG. 16. FIG. 21B is a cross-sectional view of the same example. As shown in these figures, a cold working fluid line 132 and a hot working fluid line 134 are connected to a heat exchanger 168 in the primary borehole. Below the heat exchanger, an additional cold fluid line 133 and a hot fluid line 135 are connected so that heat can be transferred from these lines through the heat exchanger to the working fluid lines above the heat exchanger. Lateral secondary boreholes 112 are connected to the cold and hot fluid lines by valves 182 and pipe segments 184. The valves and pipe segments are installed by a valve installation unit 180 on the downhole heat mining device. The secondary boreholes are drilled by lateral drilling heads 170 from secondary drilling units 172. The primary borehole is extended by a primary drill head 190.

Figure 22A:
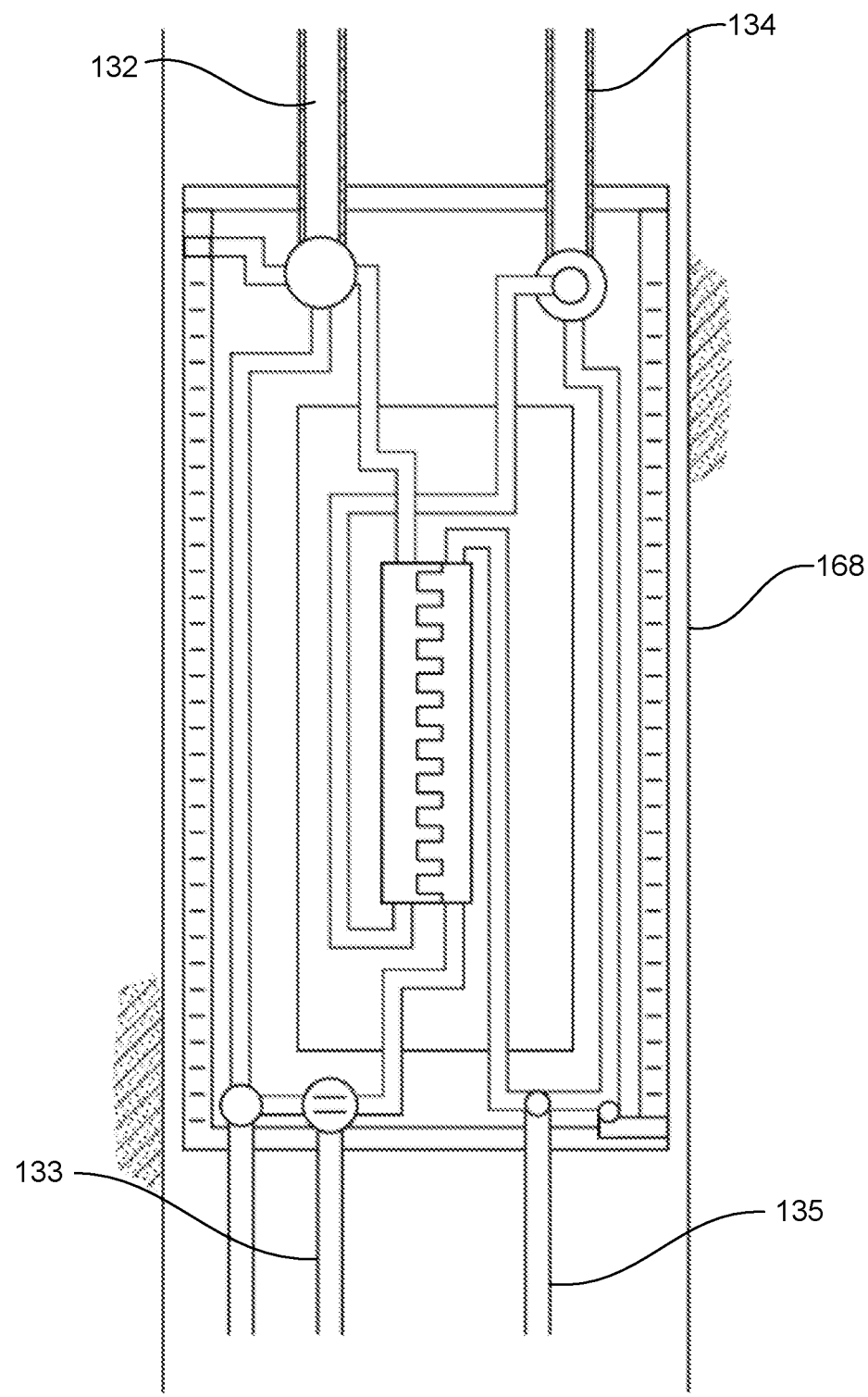
FIG. 22A is a cross-sectional view of an example heat exchanger in accordance with an embodiment of the present invention.

FIG. 22A is a cross-sectional view of an example heat exchanger 168 that can be placed in the primary borehole. The heat exchanger can be connected to a cold working fluid line 132, a hot working fluid line 134, an additional cold fluid line 133, and an additional hot fluid line 135. The heat exchanger can include plumbing to allow for multiple uses of the cold downflow fluid, which in some examples can be cold water. In certain examples, cold water can be used to cool outer shell heat exchangers, and/or the cold water can flow through the cold side of this heat exchanger to be heated and then flow back up the hot working fluid line, and/or the cold water can bypass the heat exchanger and flow down into the additional cold fluid line. The zipper-shaped interface between the cold and hot sides of the heat exchanger represents a generalized complex shape that heat exchangers can take in order to maximize heat transfer over short distances, although no particular shape is preferred. The outer shell of the heat exchanger can be comprised itself of a coiled tube serving to cool the interior of this unit, for electronics to operate reliably, and to add to the heat extraction capacity. If this unit is stationary, this cooling will not add significantly to the power production capacity as the heat in the surrounding rock would be depleted, but could provide lower temperature conditions that extend the longevity of the device.

Figure 22B:
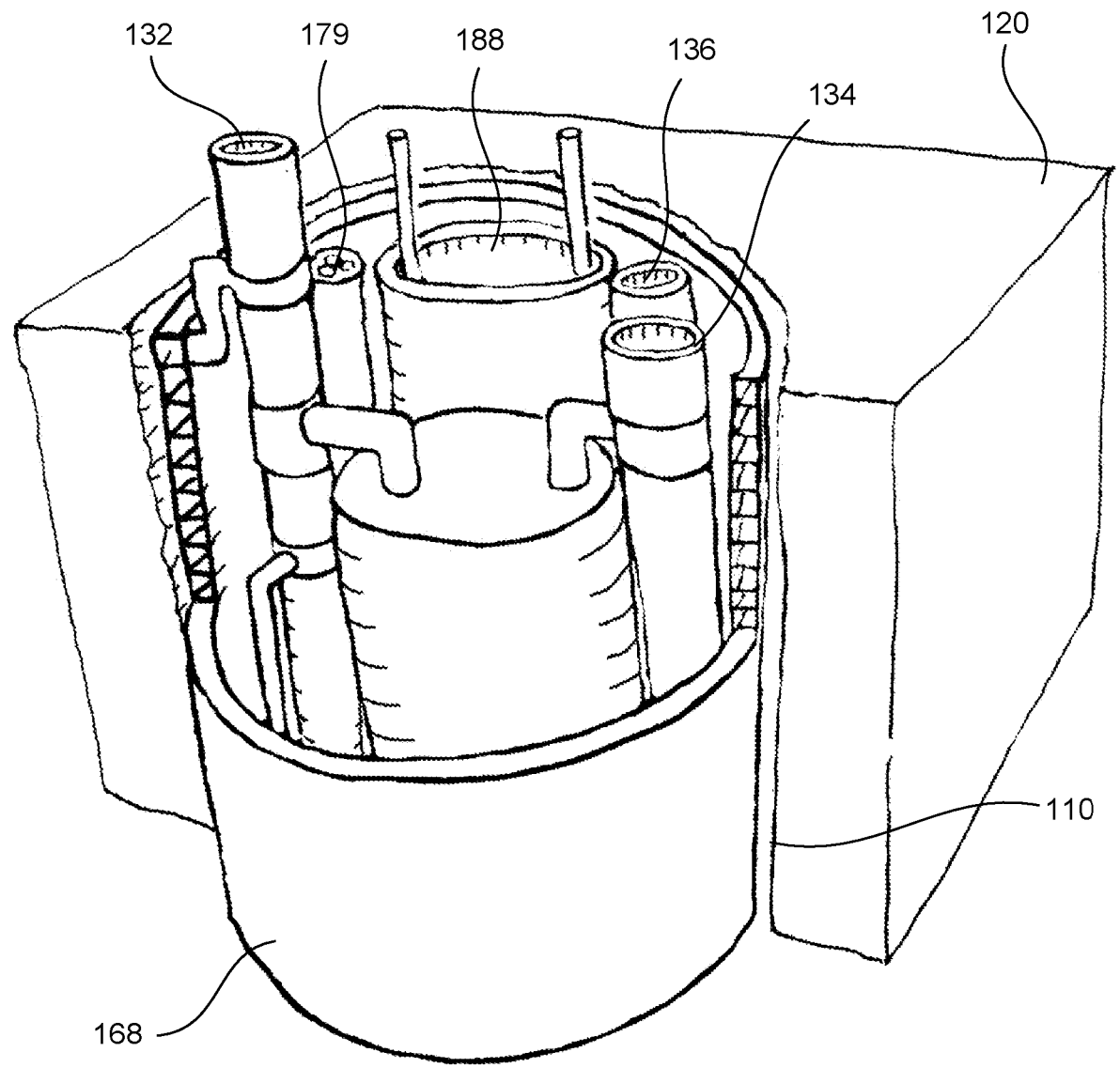
FIG. 22B is a perspective cutaway view of the example heat exchanger shown in FIG. 22A.

FIG. 22B is a perspective cut-away view of the primary borehole 110 segment where the heat exchanger 168 is placed. The component transport elevator 188, data and power cables 179, and the slurry line 136 pass through the heat exchanger as shown. The cold working fluid line 132 and hot working fluid line 134 are connected using plumbing that allows the working fluid to either flow through the cold side of the heat exchanger and be isolated from the fluid on the hot side of the heat exchanger, or the working fluid can partially or fully bypass the heat exchanger, as determined by processors optimizing the balance of heat extraction and resource duration.

Figure 23A:
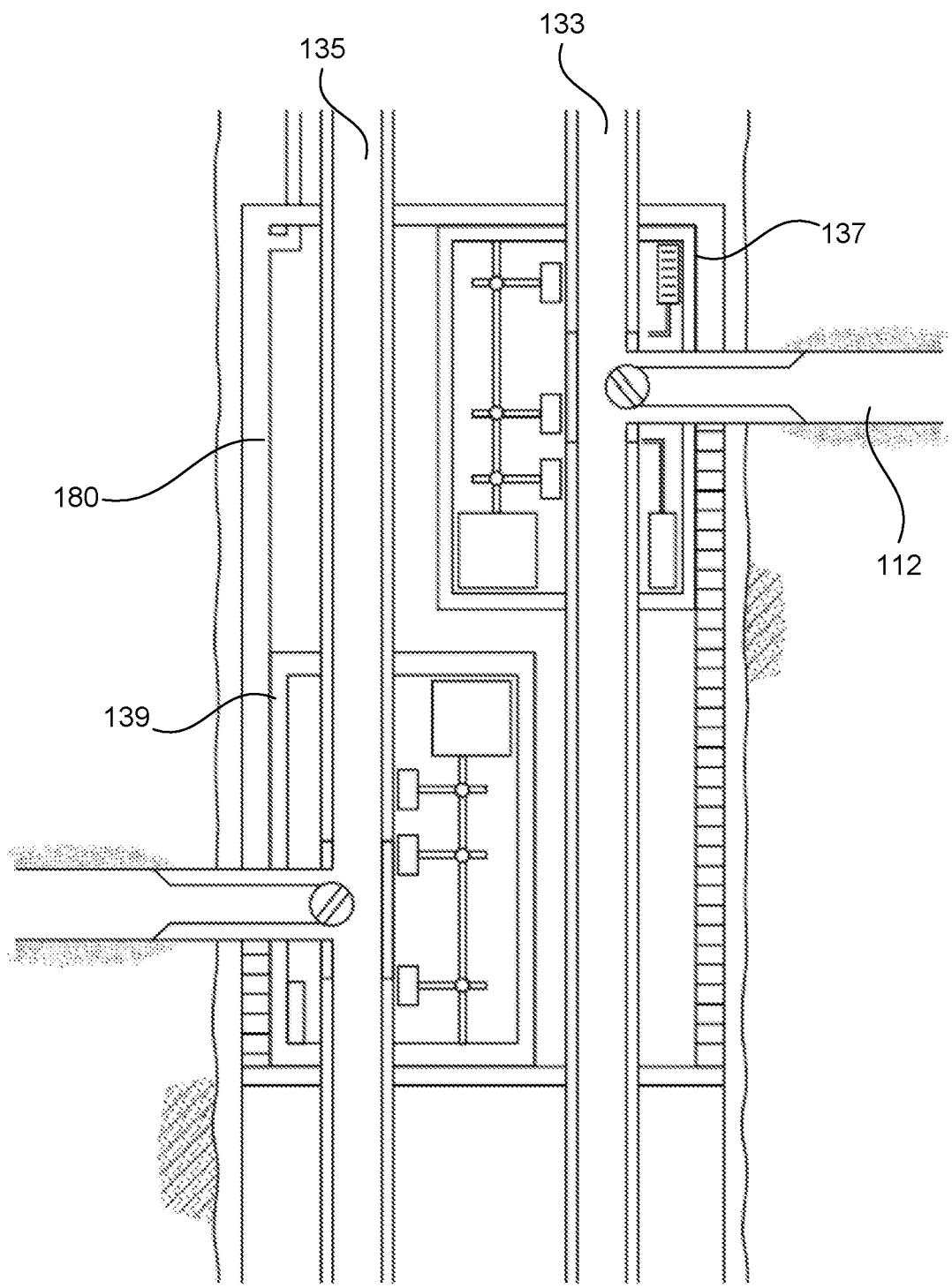
FIG. 23A is a cross-sectional view of an example valve installation unit in accordance with an embodiment of the present invention.

FIG. 23A is a cross-sectional view of an example valve installation unit 180 that can be a part of the downhole heat mining device. The whole unit can be cooled by fluid flowing through tubes or baffles as described for the heat exchanger unit. In this example, a cold fluid line 133 and a hot fluid line 135 pass through the valve installation unit. The valve installation unit can connect these lines to lateral secondary boreholes 112. The robotics to perform these tasks can operate in cooled containers 137 and 139 surrounding the pipe joints and valve locations. Cooling of these containers can be achieved by circulating cold fluid around the chamber and/or thermoelectric (Peltier) devices lining the chamber. Schematics of the robotic elements that would perform the assembly are shown. The pipe and valve components would be either produced at the surface and transported through the component elevator, or 3D printed in the apparatus.

Figure 23B:
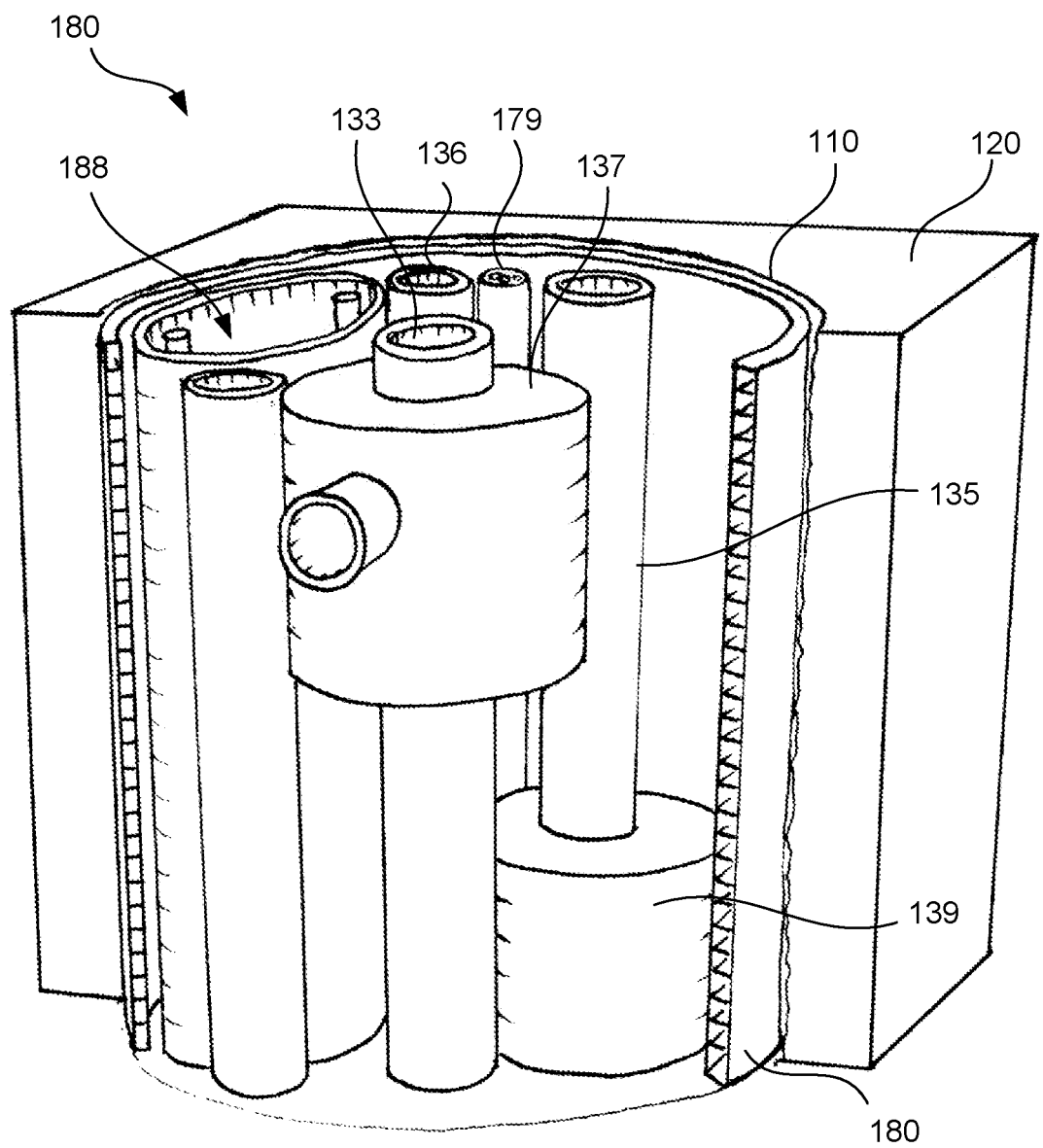
FIG. 23B is a perspective cutaway view of the valve installation unit shown in FIG. 23A.

FIG. 23B is a perspective cutaway view of the valve installation unit 180 placed in the primary borehole 110. In this view, the parts transport elevator 188, slurry line 136 and data/power lines 179 can be seen passing through the valve installation unit. The cold fluid line 133 and hot fluid line 135 also pass through, and the valve installation unit connects these lines to the lateral secondary boreholes. The two cooled containers 137 and 139 in which the robotic assembly occurs are shown surrounding the location of the valves. Upon completion, and when the next lateral borehole loop drilling is completed, this unit can descend to that location. Also, the outer shell of the unit can have baffles or tubes for cooling the interior of the unit, which can be structured to allow for a slot necessary to let the horizontal pipe pass through as the unit descends. Other implementations not shown could also be used.

Example

As an illustration of these principles, a simple thermodynamic model of two elements of the invention is presented here to highlight the time-dependent behavior of steady fluid flow and heat transfer from a rock conduit through the apparatus and then to the surface. Constant mass rate is a constraint of this calculation, along with the approximation of a constant thermal conductivity $k_s$ in the surrounding rock (which will depend strongly on the fracture density) and the heat transfer coefficient $h_{sf}$ from solid to fluid at the interface of the conduit, illustrated in FIG. 24A-24D.

Heat Equation Solution:

The governing heat equation in cylindrical coordinates is used to describe heat transfer from a cylinder of rock of radius R, to fluid (water) flowing through a cylindrical borehole (conduit) of radius $r_c$ at a constant velocity $v_f$ in the x-direction, for the solid:

$$\frac{\partial T_s}{\partial t} = \frac{k_s}{\rho_s c_s}\left(\frac{\partial^2 T_s}{\partial r^2} - \frac{1}{r}\frac{\partial T_s}{\partial r} + \frac{\partial^2 T_s}{\partial x^2}\right)$$

and for the fluid:

$$\frac{\partial T_f}{\partial t} = -\left(v_f \frac{\partial T_f}{\partial x} + \frac{T_f - T_s}{\tau_{th}}\right)$$

Figure 24A:
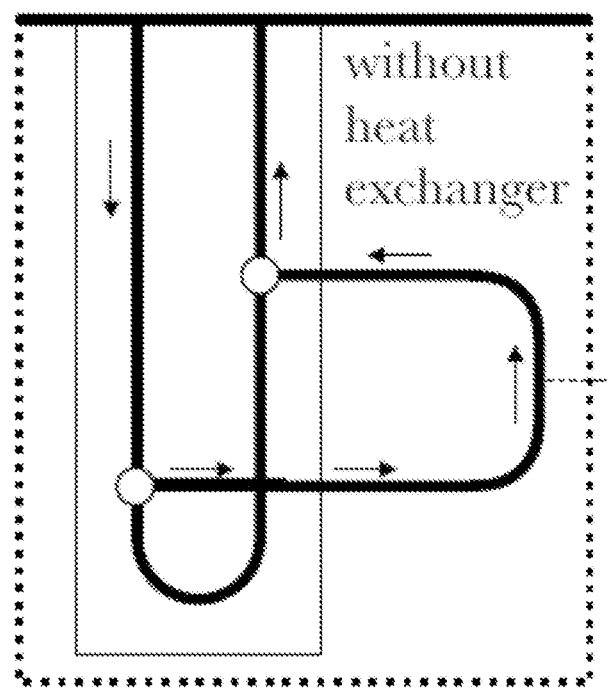
FIGS. 24A and 24B are schematic illustrations of the computational model of heat transfer in a secondary loop with a rock conduit, with and without a heat exchanger.
Figure 24B:
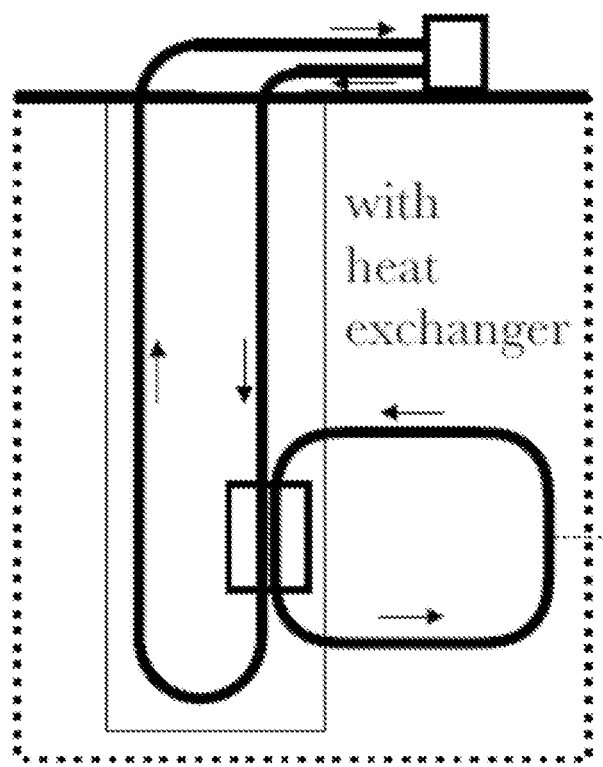
Figure 24C:
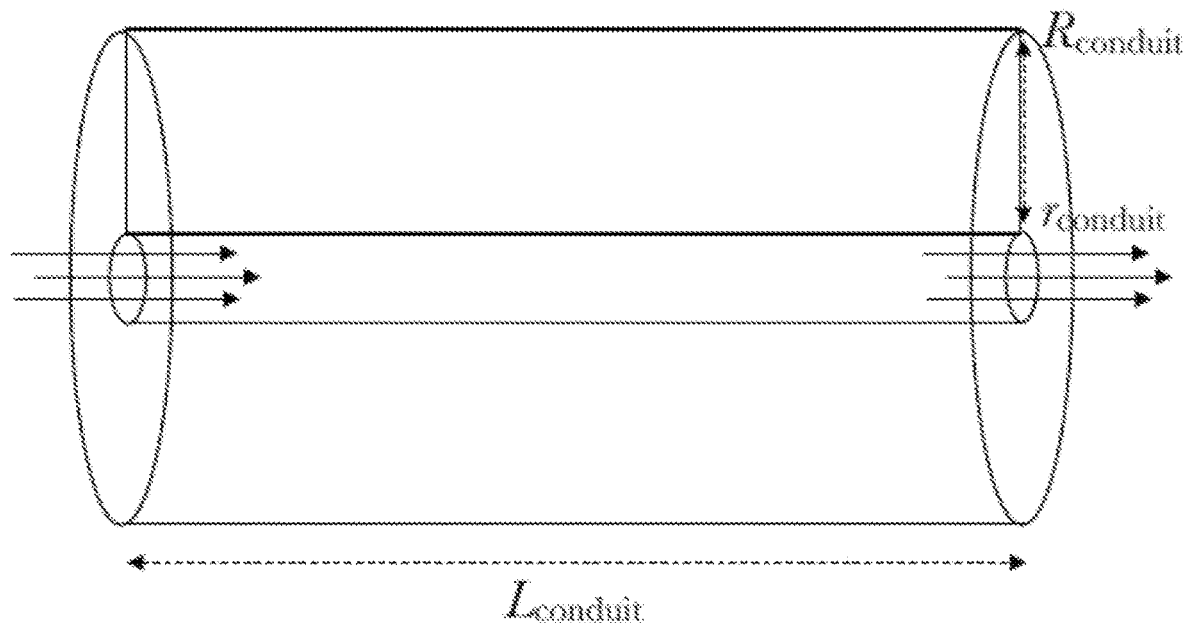
FIG. 24C and FIG. 24D are schematic illustrations of the parameters used in the computational model.
Figure 24D:
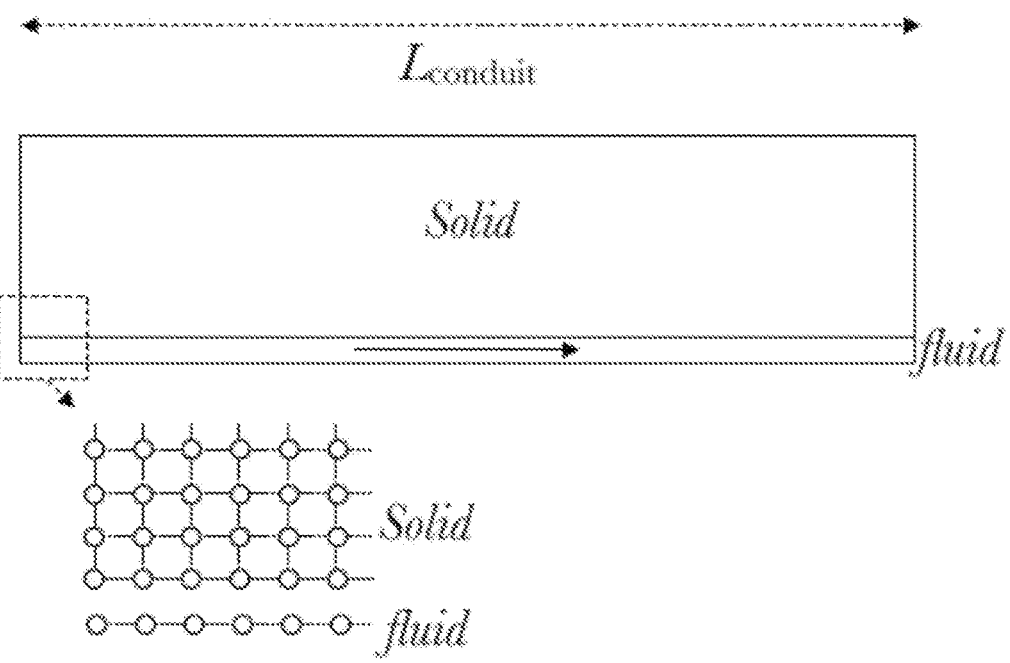

With this conductive boundary condition at the fluid-solid interface, $$k_s \frac{\partial T_s}{\partial r}\bigg|_{(r_s = r_c)} = h_{sf}(T_s - T_f)$$

and effectively no heat flux boundary conditions at the sides and outer surface of the cylinder as generally illustrated by FIGS. 24C and 24D.

In the first example calculation, in which there is no heat exchanger (FIG. 24A), the fluid entering the secondary loop conduit in the rock is at $T_j^0$, approximately the temperature at which the fluid enters the primary fluid loop at the Earth's surface. This calculation assumes that the fluid leaves the secondary loop and enters the primary loop, and is transported isothermally to the surface, at constant volume.

Heat Exchanger Solution:

In the example calculation with a heat exchanger (FIG. 24B), the fluid flowing out of the secondary loop flows directly in to the heat exchanger "hot side", and the fluid flowing out of the heat exchanger's hot side then flows back into the secondary loop, in a closed flow loop. This fluid is entering the conduit at a higher temperature than in the case without a heat exchanger, such that the rock would cool more slowly. The length and form of the heat exchanger would be optimized based on the mass flux on the hot and cold sides. It could also be adaptable/variable length. On the "cold side", fluid enters at a fixed temperature from the surface, and draws heat from the hot side, exits and returns to the surface. The heat exchange is calculated by the following set of partial differential equations, in one dimension, for the hot side and cold side, respectively:

$$\frac{\partial T_{hs}}{\partial t} = -v_{hs}\frac{\partial T_{hs}}{\partial x} - \frac{T_{hs} - T_{cs}}{\tau_{th}^{he}}$$

$$\frac{\partial T_{cs}}{\partial t} = -v_{cs}\frac{\partial T_{cs}}{\partial x} - \frac{T_{cs} - T_{hs}}{\tau_{th}^{he}}$$

These equations are solved using the method of lines incorporating ordinary differential equation solvers. The conduit and heat exchanger equations are coupled to each other by the assignment of the input/output temperatures, as described above, and illustrated in FIG. 24B.

These equations were used to calculate performance of a heat mining system using the parameters outlined in Table 1. Subscripts: s=solid, f=fluid, c refers to properties of the conduit through the rock, comprising the heat extraction cell, he refers to properties of the heat exchanger, and hs, cs refer to the hot and cold sides of the heat exchanger.

Comparison of results in FIGS. 25 A, B and C show that without the heat exchanger, fluid entering the conduit always has the value of $T_j^o$, but exits at temperatures close to the rock temperature for the given conditions of mass flux, $h_{sf}$ and conduit dimensions. With the heat exchanger, FIG. 25B, fluid enters the conduit at a much higher temperature than $T_j^o$, equal to that coming out of the hot side of the heat exchanger, meaning that the thermal energy will be drained more slowly than for the case without the heat exchanger. In FIG. 25C, the output temperature as a function of time, it can be seen that for both cases, the output temperature rises quickly and then descend quickly to a level that then declines very slowly, a few degrees per week, by 30 days. The downhole heat exchanger thus results in lower output temperatures but longer reservoir durations.

Figure 25A:
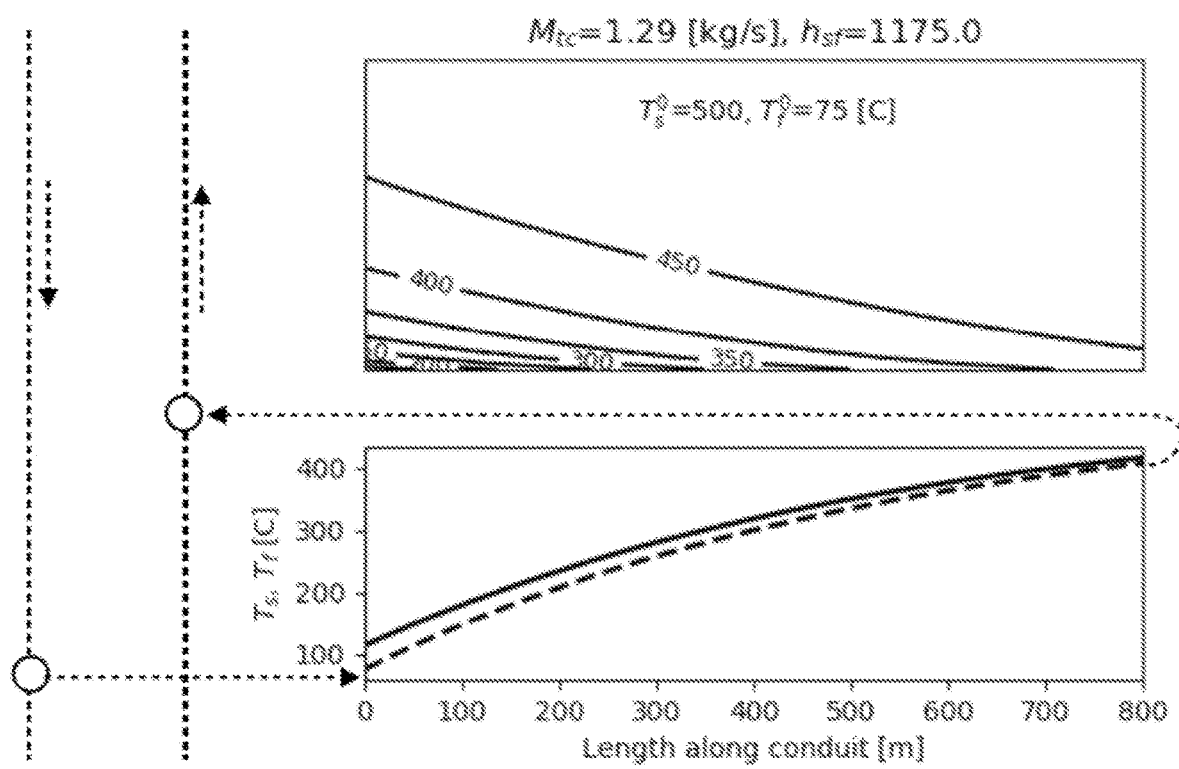
FIG. 25A is a schematic and temperature plots of a computational model without a heat exchanger.
Figure 25B:
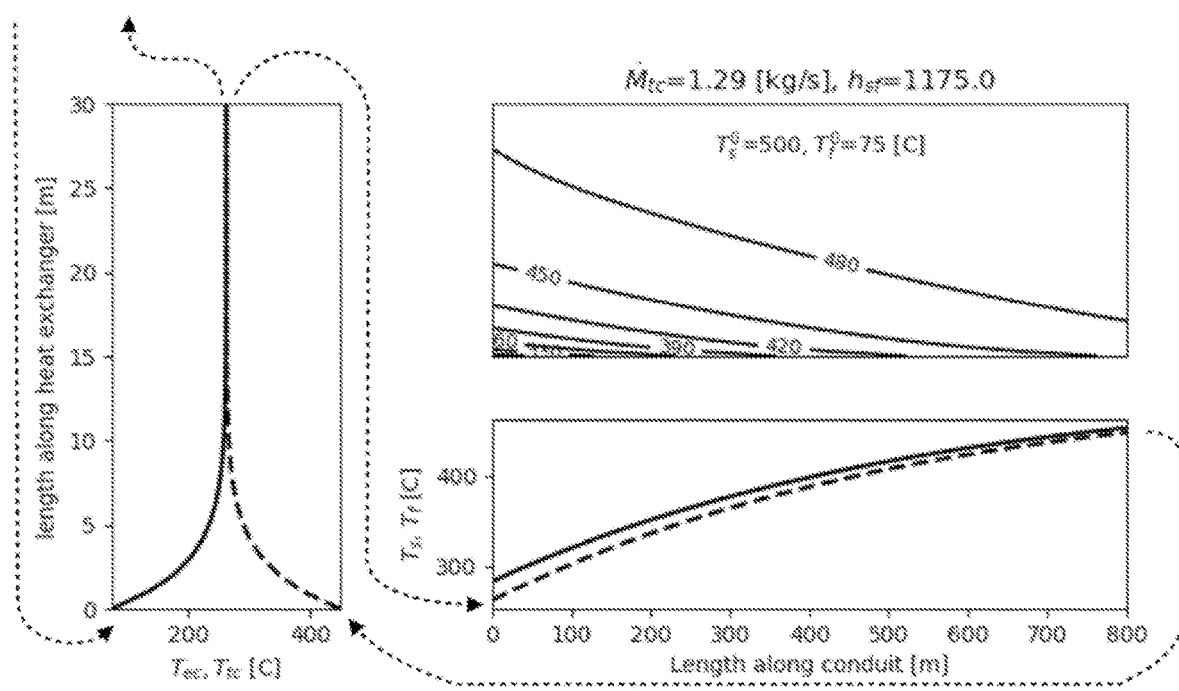
FIG. 25B is a schematic and temperature plots of a computational model with a heat exchanger.
Figure 25C:
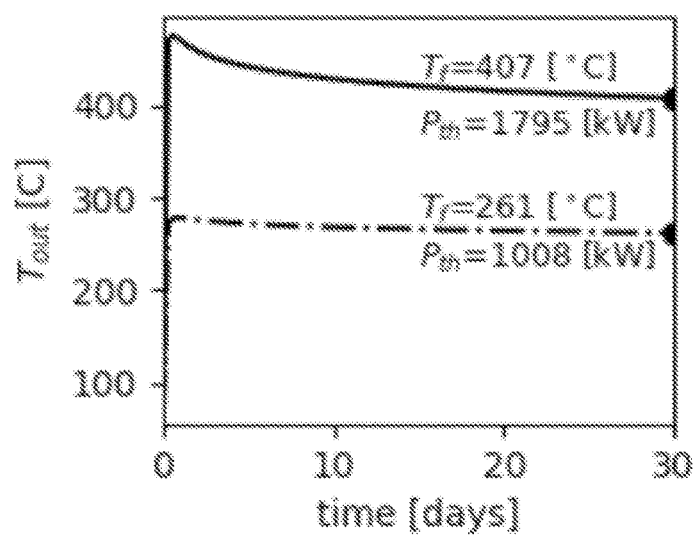
FIG. 25C is a graph of output temperature as a function of time.

Energy extraction and conversion can be determined as the thermal energy per unit time extracted by the apparatus using:

$$\mathcal{P}_{th} = \dot{m}c_p\Delta T$$

where $\Delta T = T_{out} - T_{in}$ at the surface. The value of thermal power for each model run is shown in FIG. 25C at 30 days. In this simple analysis, $P_{th}$ is then converted to electrical power, $P_e$, by a turbine generator modeled as an efficiency $n_{ge}$, as $P_e = n_{ge}P_{th}$.

Figure 25D:
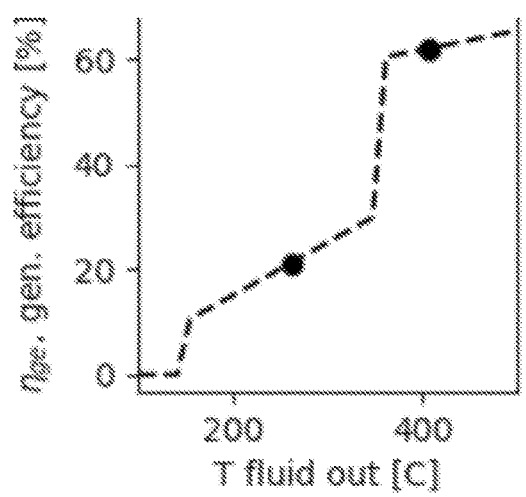
FIG. 25D is a graph of generator efficiency as a function of output temperature.

As shown in FIG. 25D, the efficiency is a strong and non-linear function of the recovered fluid temperature, estimated to reflect the variety of turbine systems optimized for different conditions. The large step upwards at about 350° C. (and 25 MPa) reflects the production of supercritical fluids rather than steam or liquid water. The two dots in FIG. 25D show that the example with no heat exchanger reaches the high efficiency conditions. The jump in efficiency is one target of this system, which, by controlling fluid pressure

TABLE 1

Table of parameters and variables.

| symbol | name | units | values | notes |
|---|---|---|---|---|
| | General energy and flow | — | — | |
| v | fluid velocity | [m/s] | controlled | — |
| $\dot{m}$ | mass rate | [kg/s] | 1.29* | $= \rho v(\pi r^2)$ |
| $T_s$ | rock temperature | [° C.] | solved for | |
| $T_f$ | fluid temperature | [° C.] | solved for | |
| $T_s^o$ | ambient rock temperature | [° C.] | 500* | |
| $T_f^o$ | fluid temperature from surface | [° C.] | var. 75° C.* | |
| | Thermal properties | — | — | |
| $c_s$ | specific heat capacity | [J/K/kg] | 790 | at constant P |
| $c_f$ | specific heat capacity | [J/K/kg] | 4180 | at constant P |
| $\rho_s$ | density | [kg/m³] | 2700 | |
| $\rho_f$ | density | [kg/m³] | 1000 | |
| $k_s$ | thermal conductivity | [W/K/m] | 5.0 | |
| $k_f$ | thermal conductivity | [W/K/m] | 0.6 | |
| $h_{sf}$ | heat transfer coefficient | [W/K/m²] | 1175* | not well known |
| $h_{he}$ | heat transfer coefficient | [W/K/m²] | var. | heat exchanger |
| $\tau_{th}^{sf}$ | thermal decay constant | [s] | — | $\tau_{th}^{sf} = \frac{\rho_f c_f r_c}{2h_{sf}}$ |
| $\tau_{th}^{he}$ | thermal decay constant | [s] | — | heat exchanger |
| | Geometric parameters | — | — | |
| $L_c$ | Length of conduit through the rock | [m] | 800* m | — |
| $r_c$ | radius of conduit through the rock | [m] | 5* cm | — |
| $N_c$ | number of conduits | — | 1-100* | — |
| $L_{he}$ | Length of heat exchanger | [m] | 20* | var. |

Subscripts: s = solid, f = fluid, $X_{hs}$ and $X_{cs}$ refer to "hot side" and "cold side" of the heat exchanger.
*indicates values used in the calculations presented here.

inside the primary and secondary loops can be optimized to keep fluids in a supercritical state upon exiting the apparatus at the surface.

Figure 25E:
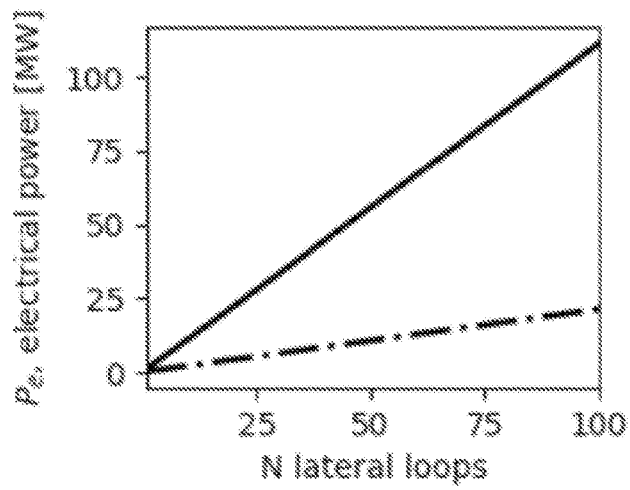
FIG. 25E is a graph of electrical power as a function of number of lateral loops.

As described above, variations of the device are designed to increase energy extraction over time by adding secondary loops as it drills to greater depths, while extracting heat from existing secondary loops, and pausing production from ones that have been overcooled to allow thermal recharge. To first order, the electrical energy can be estimated simply by multiplying the model output $P_e$ for one conduit by $N_c$, the number of active conduits, as shown in FIG. 25E, for the conditions shown in the two examples.

Based on these two examples, and the simple scaling estimate for $N_c$, the achievement of supercritical conditions leads to a much higher energy output, at a sufficient scale for production. This calculation is not intended to be taken as an economic model which can include other factors.

The comparison of the two examples can reinforce the value of the examples shown in FIGS. 21A,B that combine the two capabilities: a heat exchanger that can be bypassed enables optimization of the balance between heat extraction rates and longevity. This configuration can be advantageous if the output fluid can be maintained at a supercritical state, but utilizes the heat exchanger path to maximize the duration of productivity of existing secondary loops. Many aspects of the apparatus and system can be controlled, including the fracture density in the rock conduits that determine the physics of heat transfer. Thus, this is a system capable of heat mining in a reliable and durable manner with low economic and seismic risk, that can potentially help satisfy human energy demands without increasing atmospheric $CO_2$ levels.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A geothermal heat mining system, comprising:
   a single primary borehole in a geothermal reservoir;
   a primary fluid loop comprising a cold working fluid line leading into the primary borehole and a hot working fluid line coming out of the primary borehole;
   a secondary fluid loop located down the primary borehole, wherein the secondary fluid loop is in thermal contact with the geothermal reservoir, wherein the secondary fluid loop is adapted to circulate a fluid isolated from the primary fluid loop, and wherein the secondary fluid loop flows within a lateral secondary borehole formed in the geothermal reservoir extending out from the primary borehole; and
   a downhole heat mining device to control a rate of heat transfer from the secondary fluid loop to the primary fluid loop by selectively controlling fluid flow through the primary fluid loop, the secondary fluid loop, or both, wherein the downhole heat mining device comprises
   a heat exchanger having the primary fluid loop connected to a cold side and the secondary fluid loop connected to a hot side and wherein the heat mining device further comprises a pump in the secondary fluid loop to control the fluid flow through the secondary fluid loop; and
   a lateral drilling head oriented outward from the heat mining device to drill the secondary borehole transverse to the primary borehole.

2. The system of claim 1, wherein the system comprises multiple secondary fluid loops flowing within multiple lateral secondary boreholes, and wherein the downhole heat mining device selectively controls fluid flow through the multiple secondary fluid loops.

3. The system of claim 1, wherein the secondary fluid loop further comprises a microfracture network connecting at least a portion of the lateral secondary borehole, or a tertiary borehole extending out from the secondary borehole, or a combination thereof.

4. The system of claim 1, wherein:
   the heat mining device comprises a processor integrated in the heat mining device to generate control signals to selectively control the fluid flow; or
   the heat mining device controls the fluid flow based on control signals received from a processor outside the primary borehole; or a combination thereof.

5. The system of claim 4, wherein the processor communicates with a sensor.

6. The system of claim 5, wherein the sensor is a pressure sensor, a temperature sensor, a position sensor, or a combination thereof.

7. The system of claim 1, wherein the heat mining device comprises a drill head at a downhole end of the heat mining device, and wherein the heat mining device is adapted to extend a depth of the primary borehole using the drill head while heat is concurrently transferred from the secondary fluid loop to the primary fluid loop.

8. The system of claim 7, wherein the drill head comprises a rotary drill head, a percussive drill head, a hot spallation drill, a cold spallation drill head, or a combination thereof.

9. The system of claim 1, wherein the cold working fluid line and the hot working fluid line are not concentric, and wherein the cold working fluid line and the hot working fluid line are insulated.

10. A downhole geothermal heat mining device, comprising:
    a device body shaped to be lowered down a primary borehole;
    a cold working fluid inlet connectable to a cold working fluid line that leads down the primary borehole;
    a hot working fluid outlet connectable to a hot working fluid line that leads up the primary borehole, wherein the cold working fluid line and the hot working fluid line form a primary fluid loop;
    a controller adapted to control a rate of heat transfer to the primary fluid loop from a secondary fluid loop, wherein the secondary fluid loop is located down the primary borehole, wherein the secondary fluid loop is in thermal contact with a geothermal reservoir, and wherein the controller controls the rate of heat transfer by selectively controlling fluid flow through the primary fluid loop, the secondary fluid loop, or both;

a heat exchanger adapted to connect to the primary fluid loop on a cold side and adapted to connect to the secondary fluid loop on a hot side;

a pump adapted to control the fluid flow through the secondary fluid loop; and a lateral drilling head oriented outward from the device to drill a secondary borehole transverse to the primary borehole, wherein the secondary fluid loop includes the secondary borehole.

11. The device of claim 10, wherein the device further comprises a micro-damage head adapted to form microfractures fluidly connected along the secondary borehole, wherein the secondary fluid loop includes the microfractures.

12. The device of claim 10, wherein the device further comprises:

a valve installation unit adapted to install a valve connecting the secondary borehole to the cold working fluid line or the hot working fluid line, wherein the secondary fluid loop includes the secondary borehole.

13. The device of claim 12, wherein the valve installation unit is adapted to receive a valve lowered down the primary borehole and connect the valve to the secondary fluid loop and to the cold working fluid line or the hot working fluid line.

14. The device of claim 12, wherein the valve installation unit includes an additive manufacturing device to manufacture a valve downhole and connect the valve to the secondary fluid loop and to the cold working fluid line or the hot working fluid line.

15. The device of claim 10, further comprising a drill head at a downhole end of the device, wherein the drill head comprises a rotary drill head, a percussive drill head, a hot spallation drill head, a cold spallation drill head, or a combination thereof.

16. The device of claim 15, wherein the drill head comprises a cold spallation drill head that is connected to the cold working fluid inlet to eject cold working fluid from the cold spallation drill head.

17. A geothermal heat mining method, comprising:
forming a single primary borehole;
placing a geothermal heat mining device downhole in the primary borehole, wherein the heat mining device comprises a lateral drilling head oriented outward from the heat mining device;
forming a primary fluid loop comprising a cold working fluid line leading into the primary borehole and a hot working fluid line coming out of the primary borehole;
forming a secondary fluid loop located down the primary borehole which includes drilling a lateral secondary borehole extending out from the primary borehole using the lateral drilling head, wherein the secondary fluid loop is in thermal contact with the geothermal reservoir;
transferring heat from the secondary fluid loop to an energy storage or production unit outside the primary borehole via the primary fluid loop; and
controlling a rate of heat transfer from the secondary fluid loop to the primary fluid loop by selectively controlling fluid flow through the primary fluid loop, the secondary fluid loop, or both.

18. The method of claim 17, wherein the heat mining device further comprises a cold spallation drill head at a far end of the heat mining device, and wherein the method further comprises extending a depth of the primary bore using the cold spallation drill head or extending a length of the lateral secondary borehole while concurrently performing the transferring heat.

19. The system of claim 1, wherein the lateral drill head comprises a rotary drill head, a percussive drill head, a hot spallation drill, a cold spallation drill head, or a combination thereof.

20. The device of claim 10, wherein the lateral drill head comprises a rotary drill head, a percussive drill head, a hot spallation drill, a cold spallation drill head, or a combination thereof.

21. The method of claim 17, wherein the lateral drill head comprises a rotary drill head, a percussive drill head, a hot spallation drill, a cold spallation drill head, or a combination thereof.

22. The system of claim 4, wherein the heat mining device further includes a thermoelectric cooling device to maintain the processor at a safe operating temperature.

* * * * *